US011952475B2

(12) United States Patent
Kondo et al.

(10) Patent No.: US 11,952,475 B2
(45) Date of Patent: Apr. 9, 2024

(54) BASE FILMS FOR IMPREGNATION, IMPROVED IMPREGNATED PRODUCTS, AND RELATED METHODS

(71) Applicant: Celgard, LLC, Charlotte, NC (US)

(72) Inventors: Takahiko Kondo, Charlotte, NC (US); Masaaki Okada, Charlotte, NC (US); Stefan Reinartz, Waxhaw, NC (US); Daniel R. Alexander, Charlotte, NC (US)

(73) Assignee: Celgard, LLC, Charlotte, NC (US)

( * ) Notice: Subject to any disclaimer, the term of this patent is extended or adjusted under 35 U.S.C. 154(b) by 808 days.

(21) Appl. No.: 16/645,530

(22) PCT Filed: Sep. 12, 2018

(86) PCT No.: PCT/US2018/050547
§ 371 (c)(1),
(2) Date: Mar. 9, 2020

(87) PCT Pub. No.: WO2019/055446
PCT Pub. Date: Mar. 21, 2019

(65) Prior Publication Data
US 2020/0277465 A1   Sep. 3, 2020

Related U.S. Application Data

(60) Provisional application No. 62/557,424, filed on Sep. 12, 2017.

(51) Int. Cl.
*C08J 9/42* (2006.01)
*H01G 9/02* (2006.01)
(Continued)

(52) U.S. Cl.
CPC ............. *C08J 9/42* (2013.01); *H01M 8/0239* (2013.01); *H01M 10/052* (2013.01);
(Continued)

(58) Field of Classification Search
CPC ...... C08J 9/42; C08J 2323/06; C08J 2323/12; H01M 50/411; H01M 8/0239; H01M 10/052; H01G 9/02; H01G 11/52
See application file for complete search history.

(56) References Cited

U.S. PATENT DOCUMENTS 5,385,777 A    1/1995  Higuchi et al.
2002/0168564 A1*  11/2002  Wensley ............ H01M 10/0565
                                                  429/303
(Continued)

FOREIGN PATENT DOCUMENTS

JP          2007125821      5/2007
WO         WO2018187255    10/2018

OTHER PUBLICATIONS

PCT Written Opinion dated Dec. 12, 2018; from counterpart PCT Application No. PCT/US2018/050547.
(Continued)

*Primary Examiner* — Sarah A. Slifka
(74) *Attorney, Agent, or Firm* — Hammer & Associates, P.C.

(57) ABSTRACT

A novel or improved base film for impregnation, impregnated base film, product incorporating the impregnated base film, and/or related methods as shown, claimed or described herein.

23 Claims, 15 Drawing Sheets

(51) Int. Cl.
*H01G 11/52* (2013.01)
*H01M 8/0239* (2016.01)
*H01M 10/052* (2010.01)
*H01M 50/414* (2021.01)
*H01M 50/489* (2021.01)
*H01M 50/491* (2021.01)
*H01M 50/494* (2021.01)
*H01M 50/497* (2021.01)

(52) U.S. Cl.
CPC ....... *H01M 50/414* (2021.01); *H01M 50/489* (2021.01); *H01M 50/491* (2021.01); *H01M 50/494* (2021.01); *H01M 50/497* (2021.01); *C08J 2323/06* (2013.01); *C08J 2323/12* (2013.01); *H01G 9/02* (2013.01); *H01G 11/52* (2013.01)

(56) References Cited

U.S. PATENT DOCUMENTS

| | | | | |
|---|---|---|---|---|
| 2014/0234538 | A1* | 8/2014 | Yamada | B29C 48/00 427/126.3 |
| 2015/0028516 | A1* | 1/2015 | Duong | H01M 50/449 264/173.19 |
| 2015/0162586 | A1* | 6/2015 | Fleischmann | H01M 50/457 427/358 |
| 2016/0014918 | A1 | 5/2016 | Zhang et al. | |
| 2016/0149181 | A1* | 5/2016 | Zhang | H01M 50/494 429/247 |
| 2017/0084898 | A1 | 3/2017 | Stokes et al. | |

OTHER PUBLICATIONS

IPRP dated Mar. 26, 2020; from counterpart PCT Application No. PCT/US2018/050547.
Search Report dated Dec. 27, 2018; from counterpart PCT Application No. PCT/US2018/050547.
Kesting, Robert E. "Synthetic Polmeric Membranes, a Structural Perspective", Second Edition, John Riley and Sons, pp. 237-285 (2015).
Kesting, Robert E. "Synthetic Polmeric Membranes, a Structural Perspective", Second Edition, John Riley and Sons, pp. 291-296 (2015).
R Brdicka et al.: "Surface area and pore size determination Modern Methods in Heterogeneous Catalysis Research", Handbook of Heterogeneous Catalysis, VCH, Neinheim Handbook of Porous Solids, Jan. 1, 2004 (Jan. 1, 2004).
EP Extended Search Report dated May 7, 2021; from EP counterpart EP 18857060.0.

* cited by examiner

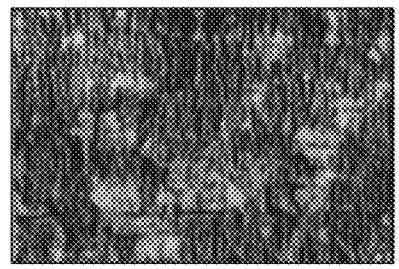 
Extrusion — MD Direction
FIG. 5
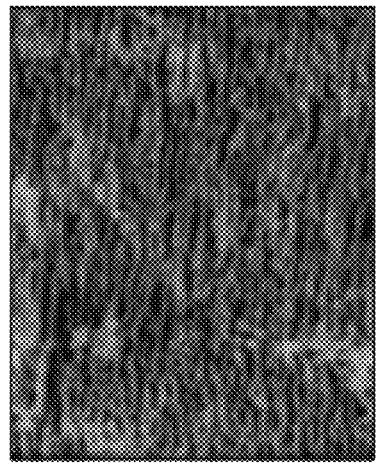 
Annealing — MD Direction
FIG. 6

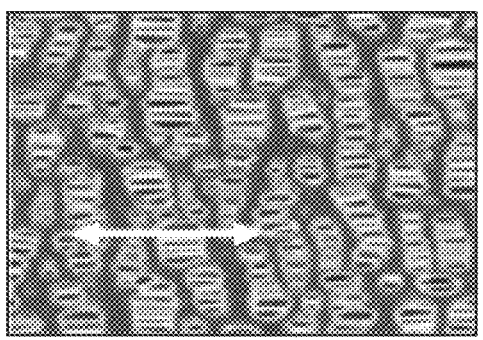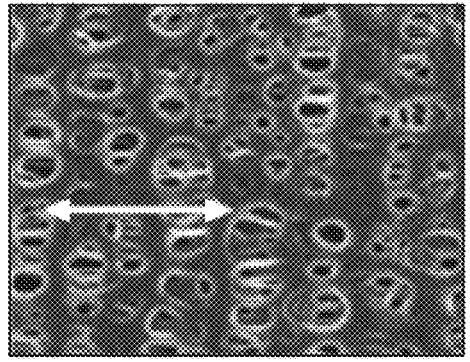
FIG. 11
One side coated:
Coating
Microporous Membrane
FIG. 12A Two side coated:

Schematic of a Lithium-ion Battery

FIG. 14 (Reference)

BASE FILMS FOR IMPREGNATION, IMPROVED IMPREGNATED PRODUCTS, AND RELATED METHODS

FIELD

In accordance with at least selected embodiments, the present application or invention is directed to novel or improved base films for impregnation, impregnated base films, products incorporating the impregnated base films, and/or related methods as shown, claimed or described herein. In accordance with at least certain embodiments, the present application or invention is directed to or provides improved base films for polymer impregnation for making improved impregnated membranes for battery separators, such as for lithium ion secondary batteries, and for other uses, such as textiles, filtration, humidity control, and the like, and related methods of making and using such base films, impregnated base films, battery separators, and/or the like. In accordance with at least particular embodiments, the present application or invention is directed to new and/or improved microporous polyolefin membranes, which may be used as or in separators for a battery, lithium battery, lead acid battery, capacitor, fuel cell, and new and/or improved methods that may be used to form the membranes and/or separators.

BACKGROUND

Microporous polymer membranes are known, can be made by various processes, and the process by which the membrane is made may have a material impact upon the membrane's physical attributes. See, for example, Kesting, Robert E., *Synthetic Polymeric Membranes, A Structural Perspective*, Second Edition, John Wiley & Sons, New York, N.Y., (1985). Three different known processes for making microporous polymer membranes include: the dry-stretch process (also known as the CELGARD process), the wet process, and the particle stretch process.

The dry-stretch process (the CELGARD process or the dry process) refers to a process where pore formation results from stretching a nonporous, semicrystalline, extruded polymer precursor in the machine direction (MD stretch) to form pores. See, for example, Kesting, Ibid. pages 290-297, incorporated herein by reference. Such a dry-stretch process is different from the wet process and the particle stretch process. Generally, in the wet process, also known as the phase inversion process, the extraction process, or the TIPS process, the polymeric raw material is mixed with a processing oil (sometimes referred to as a plasticizer), this mixture is extruded, and pores are then formed when the processing oil is removed (these films may be stretched before or after the removal of the oil). See, for example, Kesting, Ibid. pages 237-286, incorporated herein by reference. Films formed by a wet process may also be stretched.

One problem observed to varying degrees in certain dry process (including CELGARD process and particle stretch process and dry BOPP) microporous membranes is the problem of splitting, e.g., tearing or splitting along the MD direction (or MD splittiness). Such is less of a problem in BNBOPP products, yet longitudinal tearing is still a BNBOPP issue. In thin microporous membranes, the MD splittiness problem is amplified because there is no "extra meat," as there may be in a thicker membrane to compensate for the MD splittiness.

Solving the problem of MD spottiness is important, particularly if the dry process microporous membranes are to be used as thin battery separators or as thin battery shutdown separators. A microporous membrane battery separator may be thin in order to minimize the space it occupies in the battery and also to reduce conductive resistance. In addition to being thin, the microporous membrane separator should also have sufficient strength to resist puncture (e.g., increase puncture strength and/or reduce MD splittiness). MD splittiness or tearing creates difficulties in handling the separators especially in the battery manufacturing processes.

Thus, microporous membranes exhibiting improved performance such as reduced MD splittiness and methods for making the same are desirable.

SUMMARY

Disclosed herein are novel or improved base films, membranes, layers, or separators for impregnation, impregnated base films, membranes, layers, or separators, products incorporating the impregnated base films, membranes, layers, or separators, and/or related methods. The impregnated base film, membrane, layer, micro-layer, or separator may be one or more layers or microlayers of a multi-layer or composite structure. For example, the impregnated base film, membrane, layer, microlayer, or separator may be laminated to one or more other impregnated or non-impregnated base films, membranes, layers, micro-layers, and/or separators and/or to other substrates, materials, layers, and/or the like. Also, the impregnated base film, membrane, layer, microlayer, or separator may be fully impregnated, partially impregnated, impregnated with a first material on a first side and impregnated with a second material on a second side, may be impregnated with a first material and over-impregnated with a second material, and/or the like. The depth of impregnation can be controlled, for example, but without limitation, by the base film selection, impregnation material selection, or both. For example, the base film may have a large pore surface or layer and a smaller pore surface or layer. As another example, the impregnation material can be selected, made or mixed to have high viscosity, low viscosity, high wettability, low wettability, good penetration, poor penetration, and/or the like. In accordance with at least certain embodiments, the present application or invention is directed to or provides improved base films for polymer impregnation for making improved impregnated membranes for battery separators, such as for lithium ion secondary batteries, and for other uses, such as textiles, filtration, humidity control, and the like, and related methods of making and using such base films, impregnated base films, battery separators, and/or the like. In accordance with at least selected embodiments, the present application or invention is directed to new and/or improved microporous polyolefin membranes, which may be used as or in separators for a battery, lithium battery, lead acid battery, capacitor, fuel cell, lithium ion battery, polymer battery, CE, EDV, ESS, UPS, and/or ISS batteries, and new and/or improved methods that may be used to form the membranes and/or separators. In accordance with at least particular embodiments, the present application or invention is directed microporous membranes exhibiting unique pore structures, impregnated structures, reduced splittiness, e.g., machine-direction (MD) splittiness, improved puncture strength, improved elongation at break, improved hole shape in TMA or compression TMA testing (round in place of tear), improved nail penetration test results (pass NPT), improved transverse direction (TD) tensile strength, improved balance of MD and TD strength properties, improved functionalization, improved ionic conductance, provide shutdown, may be sticky (adhesive surface), may be ceramic coated, may be IR detectable, may be SEM detectable, may be a catalyst, may provide cross linking, and/or other improved performance, function, and/or characteristics. Also disclosed herein are methods of making and/or uses for the same.

In one aspect, a method for forming a microporous polymer membrane is disclosed herein. The method, in some embodiments, comprises the following: (1) extruding a polymer to form a non-porous machine-direction oriented precursor film; (2) forming a nanoporous precursor film by stretching the non-porous machine-direction oriented precursor film in a cold environment having a temperature between 5 to 55 degrees Celsius; (3) stretching the nanoporous precursor film in a hot environment having a temperature between 80 to 200 degrees Celsius to form a microporous precursor film; and (4) optionally performing one or more additional steps on the microporous precursor film. In some embodiments, stretching in the hot environment comprises, consists of, or consists essentially of stretching the oriented precursor film along at least two of the following directions: the machine direction, a transverse direction that is perpendicular to the machine direction, or a diagonal direction that intersects with the machine direction, forming an angle other than 90 degrees. Such combinations of stretching for larger pores, such as pores larger than 0.50 µm in diameter.

The extruding step, in some embodiments, may be part of a cast film extrusion process, a blown-film extrusion process, or a co-extrusion process.

In embodiments where the extruding step is part of a cast film extrusion process, the extruded polymer may comprise, consist of, or consist essentially of a polyolefin polymer, e.g., polypropylene, polyethylene, or mixtures thereof, and the polyolefin polymer may be extruded without a plasticizer, solvent or oil.

In embodiments where the extruding step is part of a blown film extrusion process, the extruded polymer may comprise, consist of, or consist essentially of a polyolefin, e.g., polypropylene, polyethylene, or mixtures thereof. In some embodiments, the extruded polymer comprises, consists of, or consists essentially of, a polymer having at least one of a melt index between 0.2 and 0.5 and/or a weight average molecular weight up to 450,000. In some embodiments, the extruded polymer comprises, consists of, or consists essentially of, a polymer having at least one of a melt index between 0.3 and 0.5 and/or a weight average molecular weight up to 400,000. In some embodiments, the extruded polymer comprises, consists of, or consists essentially of a polymer having a weight average molecular weight up to 1 million or a melt index from 0.02 to 0.15. The polymer may be extruded along with at least one other component, e.g., a processing oil and/or an organic or inorganic filler. In some embodiments, the polymer is not extruded with any other component. For example, it is not extruded with a processing oil or solvent.

In a blown film extrusion process, at least one or at least two air rings may be utilized in some embodiments. In embodiments where there are at least two air rings, the at least two air rings are arranged along a common axis. In some embodiments of the blown-film extrusion process, a blow-up ratio (BUR) of from about 0.5 to 7, more preferably 0.8 to 1.5 is used.

In some embodiments, the nonporous precursor film formed by extrusion is annealed prior to being stretched in a cold or hot environment, and in some other embodiments, the nonporous precursor film is not annealed.

After stretching in the cold environment, stretching in the hot environment may comprise, consist of, or consist essentially of stretching the nanoporous precursor film in the machine direction (MD) from 50% to 500% (0.5× to 5×) with or without change in the film in the transverse direction (TD). Stretching in the hot environment may comprise, consist of, or consist essentially of stretching the nanoporous precursor film in the transverse direction (TD) from 100% to 1000% (1× to 10×), with or without any change in the film in the machine direction (MD). In other embodiments, stretching in the hot environment may comprise, consist of, or consist essentially of stretching the nanoporous precursor film in the machine direction and in the transverse direction with controlled machine direction relax, simultaneously or sequentially in any order.

In some embodiments, after stretching in the hot environment, the stretched porous membrane is calendered, forming a calendered microporous polymer membrane. The pores of the microporous polymer membrane may then be filled with a pore filling composition comprising a polymer, optionally in an amount from 1 to 20 wt. % and a solvent. In some embodiments, the walls of the pores are coated with the pore filling composition.

In another aspect, a microporous polymer membrane made according to the methods described herein is disclosed. The microporous polymer membrane, in some embodiments, has a composite splittiness index (CSI as defined by equation 2 below) above 140, above 150, above 160, above 170, above 180, above 190, or above 200. The microporous membrane may have round or irregularly shaped pores. The pores may be relatively uniform throughout the membrane, may be asymmetrical in the Z direction, may be round, oval, trapezoidal, spherical, or slit like, or combinations thereof. The microporous membrane, in some preferred embodiments, may be a monolayer, bilayer, trilayer, or multilayer membrane. The microporous membrane may have a thickness of between 4 and 40 microns. The microporous membrane TD tensile strength is improved by adding TD stretching (with or without MD relax) and/or by impregnating the membrane with one or more polymer based impregnations or coatings. In some embodiments, the membrane has better balanced MD and TD tensile strength values, e.g., the ratio of the MD tensile strength value to the TD tensile strength value is preferably as close to 1:1 as possible. For example, it may be between 0.98:1 to 1.7:1

In another aspect, a battery separator comprising, consisting of, or consisting essentially of a microporous membrane described herein, is disclosed. The battery separator, in particularly preferred embodiments, has a coating on at least one sided thereof. It is preferred that the coating comprises, consists of, or consists essentially of a polymer and organic particles, inorganic particles, or a mixture of organic and inorganic particles.

In another aspect, a secondary lithium ion battery comprising any one of the separators described herein is disclosed.

In a further aspect, a composite comprising any battery separator described herein in direct contact with an electrode for a secondary lithium ion battery is described.

In yet another aspect, a vehicle or device comprising any battery separator described herein is described.

BRIEF DESCRIPTION OF THE DRAWINGS

FIG. 5 is an SEM of an exemplary non-porous machine-direction oriented precursor.

FIG. 6 is an SEM of an exemplary extruded and annealed non-porous machine direction oriented precursor film.

FIG. 11 includes two SEMs microporous of a precursor film resulting from MD only hot stretching (left hand side SEM) and a microporous precursor resulting from MD and TD hot stretching (right hand side SEM).

FIG. 12A is a schematic diagram illustrating an exemplary microporous membrane coated on one side only.

DETAILED DESCRIPTION (1) Extruding Step to Form a Non-Porous Precursor Film

Figure 1:
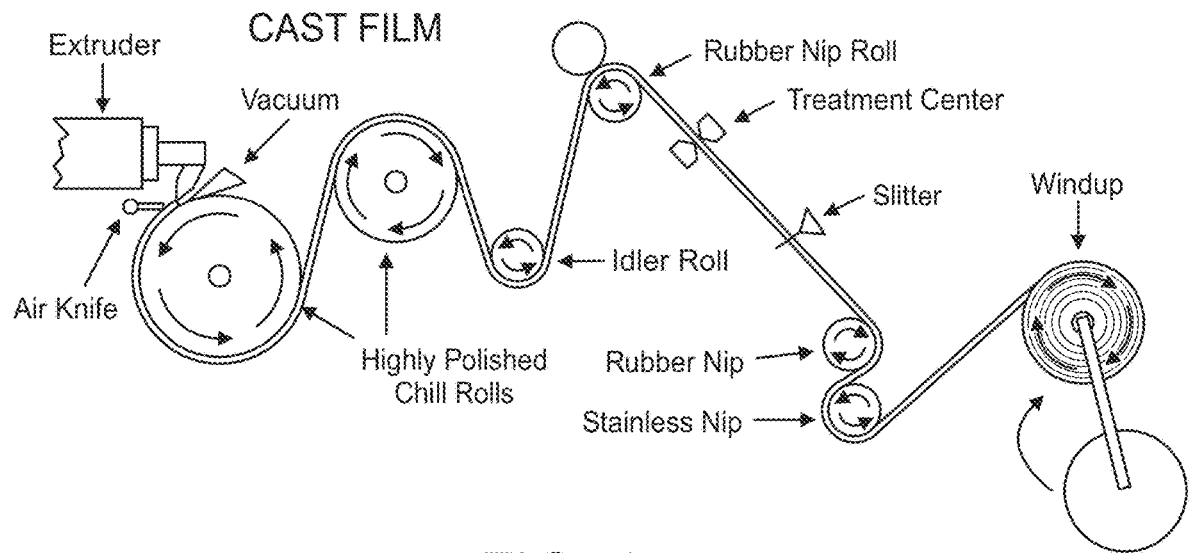
FIG. 1 is a schematic diagram illustrating an exemplary cast film extrusion process.

The extruding step may be part of a cast film extrusion process, a blown film extrusion process, or a co-extrusion process. An exemplary cast film extrusion process is shown in FIG. 1.

Figure 2:
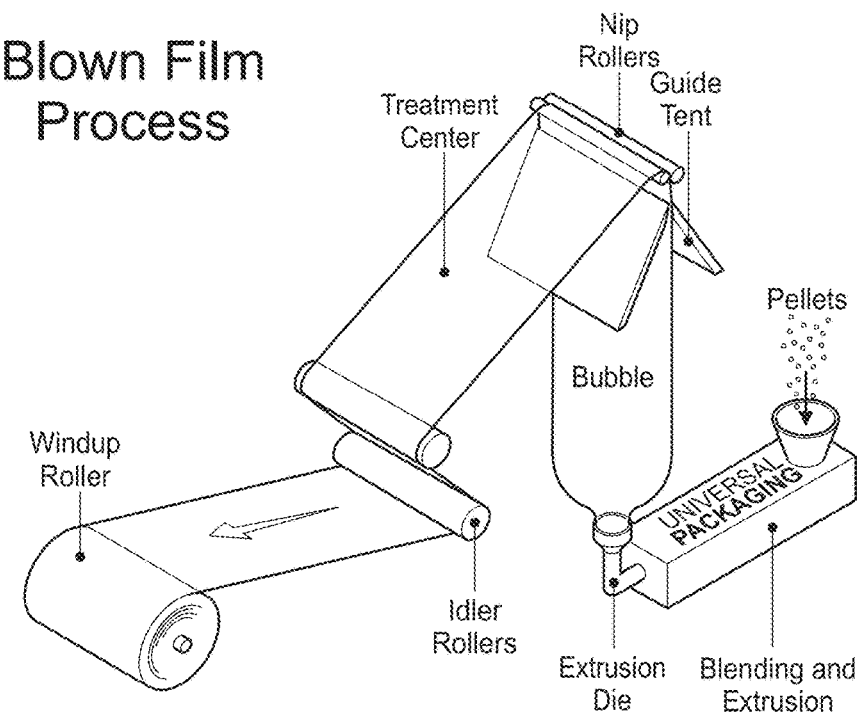
FIG. 2 is a schematic diagram of an exemplary blown-film extrusion process.

An example, of a blown-film extrusion process is shown in FIG. 2.

Figure 3:
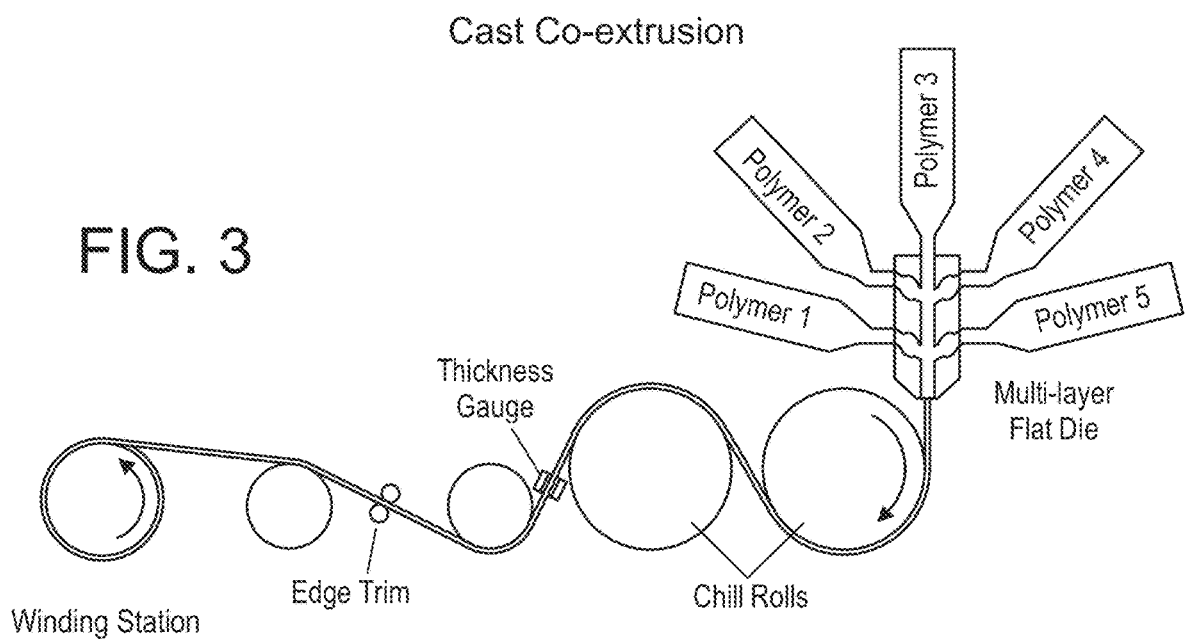
FIG. 3 is a schematic diagram of an exemplary co-extrusion process.

An example of a co-extrusion process is shown in FIG. 3.

Figure 4:
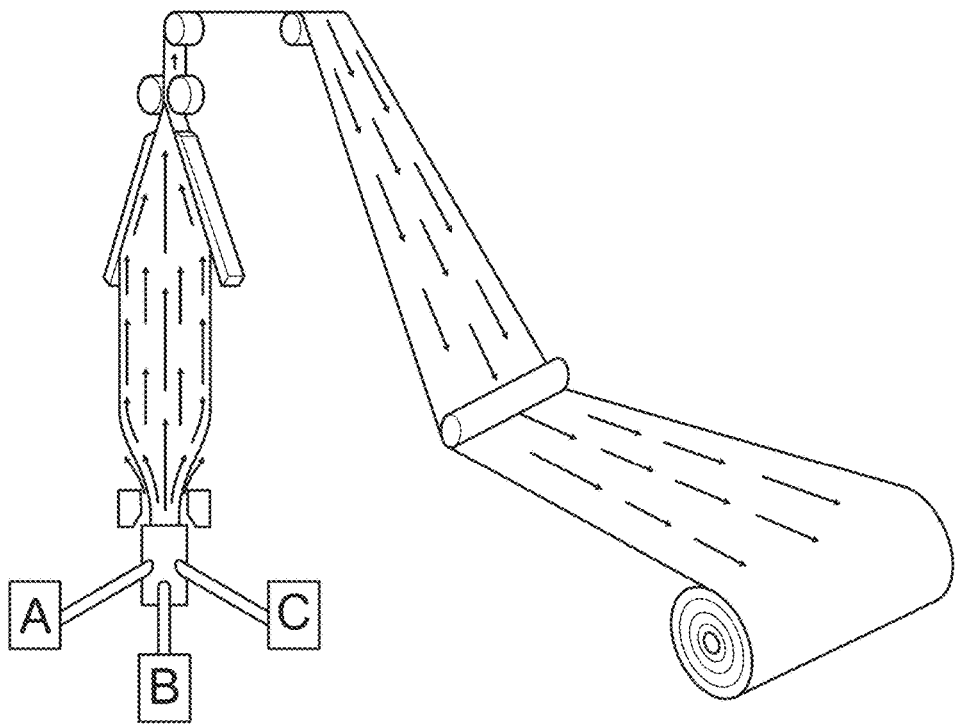
FIG. 4 is a schematic diagram of another exemplary a co-extrusion process.

Another example of a co-extrusion process is shown in FIG. 4.

The extruded polymer may comprise, consist of, or consist essentially of at least one polymer. In preferred embodiments, the polymer is one or more polyolefins, e.g., polypropylene or polyethylene, co-polymers, block co-polymers, blends, polyolefin blends, blends with other polymers, materials or additives, or combinations thereof. Each layer or microlayer can be the same polymer or a different polymer co-polymers, block co-polymers, blends, polyolefin blends, blends with other polymers, materials or additives, or combinations thereof. In other possibly preferred embodiments, the polyolefin (PO) is a high molecular weight or an ultra-high molecular weight polyolefin alone or in combination with a lower molecular weight polyolefin (and may include other additives, agents or fillers, one such additive is an elastomer, another is a stearate, still another is a cross-linker, yet another is a polymer or co-polymer, and/or the like). In certain possibly preferred embodiments, the outer material, surface, layer, or layers includes polypropylene (PP), and optionally one or more inner material, layer, or layers includes polyethylene (PE).

In some embodiments, the polyolefin described herein can be an ultra-low molecular weight, a low-molecular weight, a medium molecular weight, a high molecular weight, or an ultra-high molecular weight polyolefin, e.g., a medium or a high weight polyethylene (PE) or polypropylene (PP). For example, an ultra-high molecular weight polyolefin may have a molecular weight of 450,000 (450k) or above, e.g. 500k or above, 650k or above, 700k or above, 800k or above, etc. A high-molecular weight polyolefin may have a molecular weight in the range of 250k to 450k, e.g., 250k to 400k, 250k to 350k, or 250k to 300k. A medium molecular weight polyolefin may have a molecular weight from 150 to 250k, e.g., 150k to 225k, 150k to 200k, 150k to 200k, etc. A low molecular weight polyolefin may have a molecular weight in the range of 100k to 150k, e.g., 100k to 125k. An ultra-low molecular weight polyolefin may have a molecular weight less than 100k. The foregoing values are weight average molecular weights. In some embodiment, a higher molecular weight polyolefin may be used to increase strength or other properties of the microporous membranes or batteries comprising the same as described herein. A modified dry process may employ a small amount of a solvent or oil, and may use polymers having a molecular weight of about 600k and above. In some embodiments, a lower molecular weight polymer, e.g., a medium, low, or ultra-low molecular weight polymer may be beneficial.

In preferred dry process (or dry stretch) embodiments, the polymer is not extruded with a solvent or oil. In other embodiments, the polymer may be extruded with one or more additional components including an organic or inorganic filler. In preferred embodiments, the extruding step is part of a dry process such as the CELGARD® process, a TD or TDO dry process, a TDC dry process, a BOPP dry process, a biaxially stretched dry process, a wet or dry process producing very thin polyolefin membrane films or products, or a BNBOPP process where the polymer is extruded with a beta-nucleating agent.

When the extruding step is part of a co-extrusion process, e.g., as shown in FIGS. 3 and 4 above, each coextruded polymer may be the same or may be different. Each coextruded polymer may be as described herein above.

When the extruding step is part of a blown-film extrusion process, e.g., as shown in FIGS. 2 and 4 above, the process may utilize at least one air ring or at least two air rings. Use of at least two air rings may be preferred in some embodiments.

In other preferred embodiments where the extruding step is part of a blown-film extrusion process, the blow up ratio may be from 0.5 to 7, in preferred embodiments from 0.8 to 1.5. Different blow-up ratios may be achieved by varying the diameter of the die or the lay flat width of the bubble. Blow up ratio is calculated by the following equation (1):

$$BUR=(0.637\times Lay\text{-flat width})/die\ diameter \qquad (1)$$

The non-porous machine direction oriented precursor film formed from the extruding step is not so limited. The film may comprise, consist of, or consist essentially of one layer, one ply, mono-layer, two or more layers, two or more plies, multi-layer, one or more microlayers, three or more microlayers, an extruded or coextruded film or films, and/or may be a composite structure comprising, consisting of, or consisting essentially of two or more extruded or coextruded films (possibly preferably three or more) that are laminated together (each film may have one or more layers, plies, microlayers, or the like). The nonporous machine-direction oriented precursor film does not have micropores. It is a film that has not yet been stretched to form pores, e.g., it has not yet been stretched in the machine direction (MD) or the transverse direction (TD). An SEM of an exemplary non-porous machine-direction oriented precursor is shown in FIG. 5. In some embodiments, the non-porous machine-direction oriented precursor film may be annealed prior to being cold stretched or hot stretched. Without wishing to be bound by any theory, it is believed that an annealing step may perfect the row lamellae structure. For example, an SEM of an exemplary extruded and annealed non-porous machine direction oriented precursor film is shown in FIG. 6.

(2) Hot Stretching Step to Form a Microporous Membrane or Film

Figure 7:
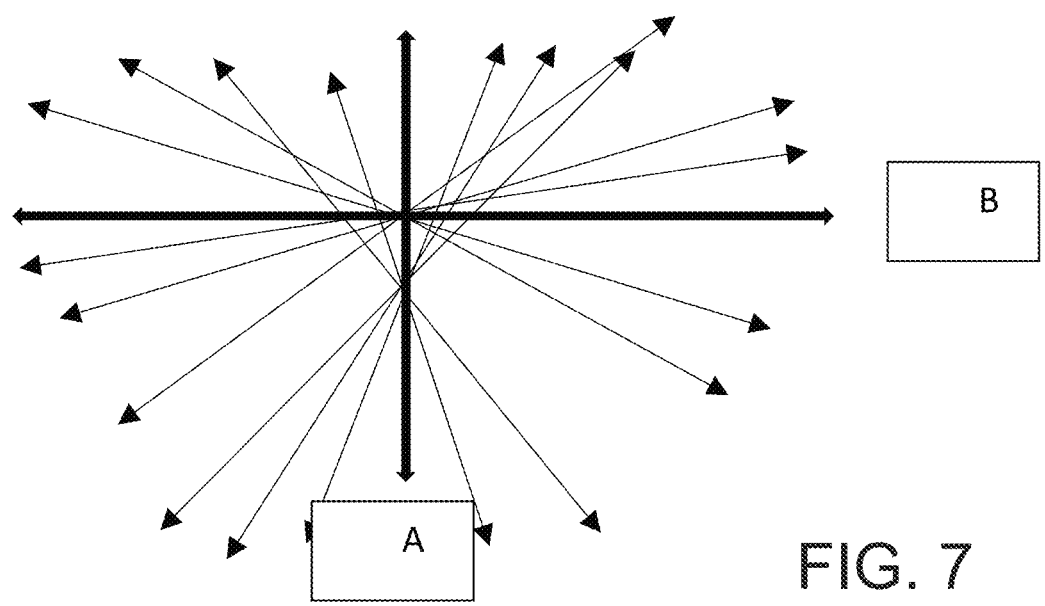
FIG. 7 is a schematic diagram illustrating alternative directions for stretching a precursor film.

The step of stretching is not so limited and may comprise, consist of, or consist essentially of stretching the non-porous machine-direction oriented precursor along at least two of the following directions: the machine direction (A in FIG. 7), a transverse direction that is perpendicular to the machine direction (B in FIG. 7), or a diagonal direction that intersects with the machine direction, forming an angle other than 90 degrees (all of the other lines in FIG. 7).

With respect to FIG. 7, the lines indicating a diagonal direction are non-limiting. Forming an angle, other than 90 degrees with the machine direction means only that the diagonal direction is not along (or the same as) the transverse direction, which is perpendicular to (or forms a 90 degree angle with) the machine direction. Stretching may occur simultaneously or sequentially, and in any order. In a preferred embodiment, the nonporous machine direction oriented precursor film is cold stretched, then hot stretched simultaneously or sequentially and in any order, along the machine direction and along at least one of the transverse direction and a diagonal direction that intersects with the machine-direction at any angle other than 90 degrees. In some embodiments, the hot stretching may occur as follows: simultaneously along the machine, direction and along the transverse direction; simultaneously along the machine direction and a diagonal direction; sequentially, in any order, along the machine direction and the transverse direction; sequentially, in any order, along the machine direction and along a diagonal direction; sequentially, in any order, along a machine direction and two or more different diagonal directions; sequentially, and in any order, along a machine direction, along a transverse direction, and along at least one diagonal direction. Without wishing to be bound by any theory, it is believed that hot stretching in the machine direction, and in at least one of the transverse direction or a diagonal direction with controlled machine, direction relax results in a microporous membrane having improved properties, including reduced machine direction splittiness, improved TD strength, and/or the like. It is believed that increased orientation in the transverse direction and/or a diagonal direction is imparted by such a hot stretching step, and may be responsible for the reduced splittiness, including machine direction (MD) splittiness.

Figure 8:
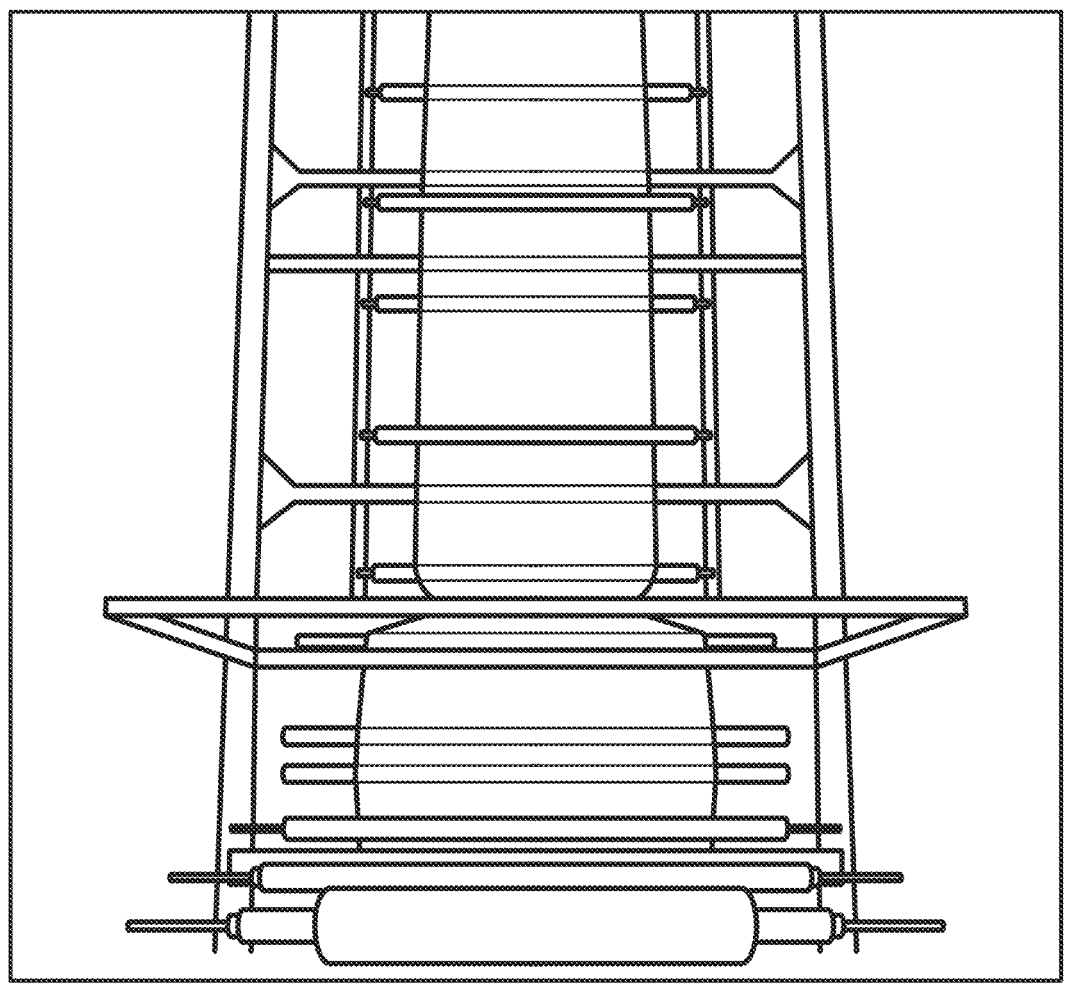
FIG. 8 is a schematic diagram illustrating stretching equipment.

Stretching may be achieved by any means not inconsistent with the stated goals herein. In some embodiments, stretching is achieved using sequential speed rollers and/or tenter frame stretching equipment. Stretching along a diagonal direction may be achieved by using rollers that are oriented at an angle with respect to the machine direction of the film as the film enters the roller. For example, the roller may be oriented as shown by the double-sided arrow in FIG. 8.

Figure 9:
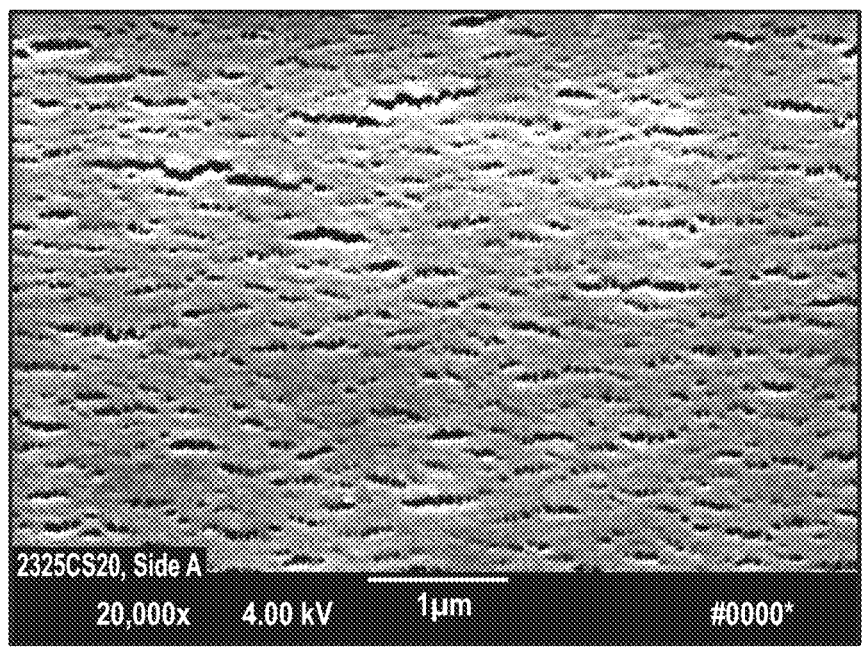
FIG. 9 is an SEM of a first surface of a non-porous precursor film that has been stretched in the machine direction only.
Figure 10:
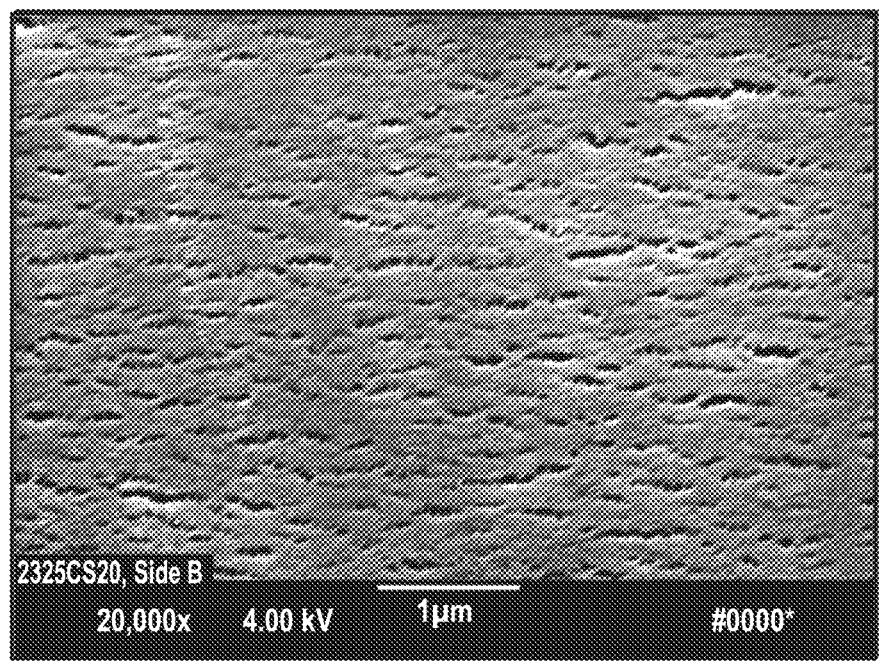
FIG. 10 is an SEM of a second surface of a non-porous precursor film that has been stretched in the machine direction only.

SEMS of the surfaces of a nonporous precursor film that has been stretched in the machine direction only are provided in FIGS. 9-10.

(3) Anneal, Stretch, then Heat Set

Heat setting after stretching to form a final mesoporous or microporous film is not so limited. In some embodiments, the heat setting step may form the final microporous membrane that can be used, for example, as a battery separator or as a base film to be coated or impregnated. In other embodiments, the microporous membrane or film is subjected to further processing steps such as calendering or pore filling to form the final microporous or nanoporous membrane that can be used as a battery separator.

Hot stretching may be done at a temperature of from 80 to 200 degrees Celsius, from 90 to 150 degrees Celsius, from 100 to 140 degrees Celsius, from 105 to 135 degrees Celsius, from 110 to 130 degrees Celsius, or from 120 to 125 degrees Celsius. For example, hot stretching may be performed in an oven at a temperature within any of these ranges.

The machine direction (MD) stretching, particularly the initial or first MD hot stretching may form micropores in the non-porous membrane precursor. Machine direction (MD) hot stretch may be conducted as a single step or multiple steps. In one embodiment, total machine direction stretching may be in the range of 50-500% (i.e., 0.5 to 5×), and in another embodiment, in the range of 100-300% (i.e., 1 to 3×). This means the width (in the MD direction) of the membrane precursor increases by 50 to 500% or by 100 to 300% compared to the initial width, i.e., before any stretching, during MD hot stretching. In some preferred embodiments, the membrane precursor is stretched in the range of 180 to 250% (i.e., 1.8 to 2.5×). During machine direction stretch, the precursor may shrink in the transverse direction. In some preferred embodiments, TD relaxation is performed during or after, preferably after, the MD stretch or during or after, preferably after, at least one step of the MD stretch, including 10 to 90% TD relax, 20 to 80% TD relax, 30 to 70% TD relax, 40 to 60% TD relax, at least 20% TD relax, 50%, etc. Not wishing to be bound by any particular theory, it is believed that performing MD hot stretching with TD relax keeps the pores that are formed by the MD stretching small. In other preferred embodiments, TD relaxation is not performed.

MD tensile strength of the only MD hot stretched (not subjected to TD hot stretch) membrane precursor is high, e.g., if can be as high as 150 kg/cm$^2$ and above or 200 kg/cm$^2$ or above. However, TD tensile strength and puncture strength of these only MD hot stretched membrane precursors may not be ideal. Puncture strength, for example, may be less than 300 gf and TD tensile strength, for example, less than 200 kg/cm$^2$ or less than 150 kg/cm$^2$.

Thus, particularly preferred embodiments are those where both machine direction and transverse direction hot stretching are performed.

Transverse direction (TD) hot stretching of the precursor is not so limited and can be performed in any manner that is not contrary to the stated goals herein. The transverse direction stretching may be conducted in a single step or in multiple steps. In one embodiment, total transverse direction hot stretching may be in the range of 100-1200%, in the range of 200-900%, in the range of 450-600%, in the range of 400-600%, in the range of 400-500%, etc. In one embodiment, a controlled machine direction relax may be in a range from 5-80%, and in another embodiment, in the range of 15-65%. In one embodiment, TD hot stretching may be carried out in multiple steps. During transverse direction hot stretching, the precursor may or may not be allowed to shrink in the machine direction. In an embodiment of a multi-step transverse direction hot stretching, the first transverse direction hot stretch step may include a transverse direction hot stretch with the controlled machine relax, followed by simultaneous transverse and machine direction stretching, and followed by transverse direction relax and no machine direction stretch or relax. For example, TD hot stretching may be performed with or without machine direction (MD) relax. In some preferred embodiments, MD relax is performed, including 10 to 90% MD relax, 20 to 80% MD relax, 30 to 70% MD relax, 40 to 60% MD relax, at least 20% MD relax, 50%, etc.

Transverse direction (TD) hot stretching may improve transverse direction tensile strength and may reduce splittiness of a microporous membrane compared to, for example, a microporous membrane that is not subjected to TD hot stretching during manufacture and has only been subjected to machine direction hot stretching. Thickness may also be reduced, which is desirable. However, TD stretching may also result in decreased JIS Gurley, e.g., a JIS Gurley of less than 100 or less than 50, and increased porosity of the MD and TD hot stretched membrane as compared to the only MD hot stretched precursor. This may be due, at least in part, to the larger size of the micro-pores as shown in FIG. 11. FIG. 11 shows microporous precursor film resulting from MD only hot stretching (left) and a microporous precursor resulting from MD and TD hot stretching (right), The double sided arrows indicate the MD direction.

The microporous precursors in FIG. 11 would have different pore structures than what is shown in FIG. 11 if a diagonal stretch was part of the manufacturing process. For example, the pores would be more irregularly shaped, instead of being slit shaped (left in FIG. 11) or round (right in FIG. 11).

(4) Optional Additional Steps

In some embodiments, the microporous precursor film is the final microporous membrane product, but in some embodiments, one or more additional steps may be performed on the microporous precursor film to obtain the microporous membrane. A method described herein, for example, may further include performing at least one of the following additional steps on the microporous precursor film: (a) a calendering step, (b) an additional hot or cold stretching step as described herein above, (c) an additional hot TD stretching step (with or without MD relax) as described hereinabove, and (d) a pore-filling or impregnation step. In some embodiments, at least two, at least three, or all four of steps (a)-(d) may be performed.

The calendering step is not so limited and can be performed in any manner not inconsistent with the stated goals herein. For example, in some embodiments the calendering step may be performed as a means to reduce the thickness of the microporous precursor film, as a means to reduce the porosity of the microporous precursor film in a controlled manner and/or to further improve the transverse direction (TD) tensile strength or puncture strength of the microporous precursor film. Calendering may also improve strength, wettability, and/or uniformity and reduce surface layer defects that have become incorporated during the manufacturing process e.g., during the MD and TD stretching processes. The calendered microporous precursor film may have improved coatability. Using a texturized calendering roll may aid in improved coating-to-base membrane adhesion.

Calendering may be cold (below room temperature), ambient (room temperature), or hot (e.g., 90° C.) and may include the application of pressure or the application of heat and pressure to reduce the thickness of a membrane or film in a controlled manner. In addition, the calendering process may use at least one of heat, pressure and speed to density a heat sensitive material. In addition, the calendering process may use uniform or non-uniform heat, pressure, and/or speed to selectively density a heat sensitive material, to provide a uniform or non-uniform calender condition (such as by use of a smooth roll, rough roll, patterned roll, micro-pattern roll, nano-pattern roll, speed change, temperature change, pressure change, humidity change, double roll step, multiple roll step, or combinations thereof), to produce improved, desired or unique structures, characteristics, and/or performance, to produce or control the resultant structures, characteristics, and/or performance, and/or the like.

In preferred embodiments, calendering the microporous precursor film results in a decrease in the thickness of the microporous precursor film. In some embodiments, the thickness is decreased by 30% or more, by 40% or more, by 50% or more, or by 60% or more. In some preferred embodiments, the thickness is reduced to 10 microns or less, sometimes 9, or 8, or 7, or 6, or 5, or 4 microns or less.

The pore filling, pore coating, or impregnation step may comprise applying a pore filling composition to the macroporous, mesoporous, microporous precursor film, which pore filling composition may comprise a solvent and a polymer in an amount of 1 to 20 wt. % with respect to the entire pore filling or coating composition. The pore filling composition may be applied by any coating method, including immersion coating, roll coating, dip coating, etc.

Microporous Membrane

In another aspect, a microporous membrane described herein has improved splittiness as measured by a test known as the Composite Splittiness Index (CSI). CSI has been developed where CSI value is defined by equation 2 (below) where CSI is a function of the first load peak, the second load peak, TD tensile strength, MD tensile strength, and TD elongation measured during puncture strength testing.

$$CSI = (A - |B - A|^{1.8}) \times C \times (D \times E)/10^6 \quad (2)$$

where:
A=First Load Peak/(Thickness×(1−% Porosity));
B=Second Load Peak/Thickness;
C=TD Elongation;
D=MD Tensile Strength;
E=TD Tensile Strength; and where First and Second Load Peak are in units of gram-force, thickness values are in microns, MD and TD tensile strength are in gram-force, and TD elongation is expressed as percentage. A high CSI value is predictive of a microporous membrane that may have excellent strength performance in a lithium ion battery, both during the battery cell winding step in the manufacturing process and during expansion and contraction of the membrane which can occur during repeat charge and discharge cycles throughout the lifetime of the battery.

The microporous membrane described herein have a CSI value of above 140, above 150, above 160, above 170, above 180, above 190, above 200 or above 250.

The microporous membrane may be made according to any one of the methods disclosed herein. In some preferred embodiments, the microporous membrane has superior properties, even without the addition of a surface coating, e.g., a ceramic coating, which may improve these properties.

In some preferred embodiments, the microporous membrane or pore coated membrane itself, e.g., without any additional surface coating thereon, has a thickness ranging from 2 to 50 microns, from 4 to 40 microns, from 4 to 30 microns, from 4 to 20 microns, from 4 to 10 microns, or less than 10 microns. The thickness, e.g., a thickness of 10 microns or less, may be achieved with or without a calendering step. Thickness may be measured in micrometers, μm, microns, or um, using the Emveco Microgage 210-A micrometer thickness tester and test procedure ASTM D374. Thin microporous membranes are preferable for some applications. For example, when used as a battery separator, a thinner separator membrane allows for use of more anode and cathode material in the battery, and consequently, a higher energy and higher power density battery results.

In some preferred embodiments, the microporous membrane may have a JIS Gurley ranging from 50 to 300, 75 to 300, and or 100 to 300. However, the JIS Gurley value is not so limited and higher, e.g., above 300, or lower, e.g., below 50, JIS Gurley values may be desirable for different purposes. Gurley is defined herein as the Japanese Industrial Standard (JIS Gurley) and is measured herein using the OHKEN permeability tester. JIS Gurley is defined as the time in seconds required for 100 cc of air to pass through one square inch of film at a constant pressure of 4.9 inches of water. JIS Gurley of the entire microporous membrane or of individual layers of the microporous membrane, e.g., an individual layer of a trilayer membrane may be measured. Unless otherwise specified herein, reported JIS Gurley values are those of the microporous membrane. In at least one embodiment there is provided a low Gurley membrane having desired strength and/or other performance. In at least another embodiment there is provided a thin, low Gurley membrane having desired strength and/or other performance (such as desired elongation at break, puncture strength, shrinkage, reduced splittiness, passes the drop test, passes the nail penetration test, and/or the like).

In some preferred embodiments, the microporous membrane has a puncture strength greater than 250 (gf), without normalization, or greater than 300, 350, or 400 (gf) at normalized thickness/porosity, e.g., at a thickness of 14 microns and a porosity of 50%. Sometimes the puncture strength is between 300 and 700 (gf), between 300 and 600 (gf), between 300 and 500 (gf), between 300 and 400 (gf), etc. In some embodiments, if it is desirable for a particular application, the puncture strength may be lower than 300 gf or higher than 600 gf, but the range of 300 (gf) to 700 (gf) is a good working range for battery separators, which is one way the disclosed microporous membranes may be used. Puncture Strength is measured using Instron Model 4442 based on ASTM D3763. The measurements are made across the width of the microporous membrane and the puncture strength defined as the force required to puncture the test sample.

Normalization of the measured puncture strength and thickness of any microporous membrane (e.g., having any porosity or thickness) to a thickness of 14 microns and a porosity of 50% is achieved using the following equation (3):

$$[\text{measured puncture strength (gf)} \cdot 14 \text{ microns}]/[\text{measured thickness (microns)} \cdot 50\% \text{ porosity}] \tag{3}$$

Normalization of the measured puncture strength values allows thicker and thinner microporous membranes to be compared side-by-side. Thicker microporous membranes made in an identical manner to their thinner counterparts will often have puncture strengths due to their greater thickness.

In some preferred embodiments, the microporous membrane has a porosity, e.g., a surface porosity, of about 20 to about 90%, sometimes about 30 to about 80%, sometimes about 40 to about 70%, sometimes about 45 to about 65%, etc. In some embodiments, if it is desirable for a particular application, the porosity may be higher than 70% or lower than 40%, but the range of 40 to 70% is a working range for battery separators, which is one way the disclosed microporous membranes may be used. Porosity is measured using ASTM D-2873 and is defined as the percentage of void space, e.g., pores, in an area of the microporous membrane, measured in the Machine Direction (MD) and the Transverse Direction (TD) of the substrate. Porosity of the entire microporous membrane or of individual layers of the microporous membrane, e.g., an individual layer of a trilayer membrane may be measured. Unless otherwise specified herein, reported porosity values are those of the microporous membrane.

In some preferred embodiments, the microporous membrane has a high machine direction (MD) and transverse direction tensile strength. Machine Direction (MD) and Transverse Direction (TD) tensile strength are measured using Instron Model 4201 according to ASTM-882 procedure. In some embodiments, the TD tensile strength is 250 kg/cm$^2$ or higher, sometimes it is 300 kg/cm$^2$ or higher, sometimes 400 kg/cm$^2$ or higher, and sometimes 500 kg/cm$^2$ or higher. Regarding the MD tensile strength, sometimes the MD tensile strength is 500 kg/cm$^2$ or higher, 600 kg/cm$^2$ or higher, 700 kg/cm$^2$ or higher, 800 kg/cm$^2$ or higher, 900 kg/cm$^2$ or higher, or 1000 kg/cm$^2$ or higher. The MD tensile strength may be as high as 2000 kg/cm$^2$.

In some preferred embodiments, the microporous membrane has reduced machine direction (MD) and transverse direction (TD) shrinkage even without application of a coating, e.g., a ceramic coating. For example, MD shrinkage at 105° C. may be less than or equal to 20% or less than or equal to 15%. MD shrinkage at 120° C. may be less than or equal to 35%, less than or equal to 29%, less than or equal to 25%, etc. The TD shrinkage at 105° C. may be less than or equal to 10%, 9%, 8%, 7%, 6%, 5%, or 4%. The TD shrinkage at 120° C. may be less than or equal to 12%, 11%, 10%, 9%, or 8%. Shrinkage is measured by placing a test sample, e.g., a microporous membrane without any coating thereon, between two sheets of paper which are then clipped together to hold the sample between the papers and suspended in an oven. For the 105° C. testing, a sample is placed in an oven at 105° C. for a length of time, e.g., 10 minutes, 20 minutes, or one hour. After the designated heating time in the oven, each sample is removed and taped to a flat counter surface using double side sticky tape to flatten and smooth out the sample for accurate length and width measurement. Shrinkage is measured in the both the MD, i.e., to measure MD shrinkage, and TD direction (perpendicular to the MD direction), i.e., to measure TD shrinkage, and is expressed as a % MD shrinkage and % TD shrinkage.

In some preferred embodiments, average dielectric breakdown of the microporous membrane is between 900 and 2000 Volts. Dielectric breakdown voltage was determined by placing a sample of the microporous membrane between two stainless steel pins, each 2 cm in diameter and having a flat circular tip, and applying an increasing voltage across the pins using a Quadtech Model Sentry 20 hipot tester, and recording the displayed voltage (the voltage at which current arcs through the sample).

In some preferred embodiments, the microporous membrane has each of the following properties, without or prior to application of any coating, e.g., a ceramic coating: a TD tensile strength greater than 250 kg/cm$^2$, a puncture strength, with or without normalization, greater than 300 gf, and a JIS Gurley greater than 50. In some embodiments the JIS Gurley is between 50 and 300 or between 100 and 300, and the TD tensile strength greater than 250 kg/cm$^2$ and the puncture strength greater than 300 gf. In some embodiments, the puncture strength is between 300 and 600 (gf), with or without normalization for thickness and porosity, e.g., a thickness of 14 microns and a porosity of 50%, or sometimes the puncture strength is between 400 and 600 (gf), with or without normalization for thickness and porosity, e.g., a thickness of 14 microns and a porosity of 50%, and the TD tensile strength is greater than 250 kg/cm$^2$ and the JIS Gurley is greater than 50. In some embodiments, the TD tensile strength is between 250 kg/cm$^2$ and 600 kg/cm$^2$, between 250 and 590 kg/cm$^2$, or between 250 and 500 kg/cm$^2$, and the JIS Gurley is greater than 50 and the puncture strength is greater than 300 (gf).

In some preferred embodiments MD/TD tensile strength ratio may be from 1 to 5 from 1.45 to 2.2, from 1.5-5, from 2 to 5, etc.

The microporous membranes and separators disclosed herein may have improved thermal stability as shown, for example, by desirable behavior in hot tip hole propagation studies. The hot tip test measures the dimensional stability of the microporous membrane under point heating condition. The test involves contacting the separators with a hot soldering iron tip and measuring the resulting hole. Smaller holes are generally more desirable. In some embodiments, hot tip propagation values may be from 2 to 5 mm, from 2 to 4 mm from 2 to 3 mm or less than these values.

In some embodiments, tortuosity may be greater than 1, 1.5, or 2, or higher, but preferably between 1 and 2.5. It has been discovered to be advantageous to have a microporous separator membrane with high tortuosity between the electrodes in a battery in order on order to avoid cell failure. A membrane with straight through pores is defined as having a tortuosity of unity. Tortuosity values greater than 1 are desired in at least certain preferred battery separator membranes that inhibit the growth of dendrites. More preferred are tortuosity values greater than 1.5. Even more preferred are separators with tortuosity values greater than 2. Without wishing to be bound by any particular theory, the tortuosity of the microporous structure of at least certain preferred dry and/or wet process separators (such as Celgard® battery separators) may play a vital role in controlling and inhibiting dendrite growth. The pores in at least certain Celgard® microporous separator membranes may provide a network of interconnected tortuous pathways that limit the growth of dendrite from the anode, through the separator, to the cathode. The more winding the porous network, the higher the tortuosity of the separator membrane. A potentially preferred Celgard® membrane may be a Celgard® Z Series membrane or another Celgard® membrane or separator having some TD stretch (with or without MD relax).

In some embodiments, the coefficient of friction (COF) static may be less than 1, less than 0.9, less than 0.8, less than 0.7, less than 0.6, less than 0.5, less than 0.4, less than 0.3, less than 0.2, etc. COF (Coefficient of friction) Static is measured according to JIS P 8147 entitled "Method for Determining Coefficient of Friction of Paper and Board."

Pin removal force may be less than 1000 grams-force (gf), less than 900 gf, less than 800 gf, less than 700 gf, less than 600 gf, etc. A test for pin removal is described herein below:

A battery winding machine was used to wind the separator (which comprises, consists of, or consists essentially of a porous substrate with a coating layer applied on at least one surface thereof) around a pin (or core or mandrel). The pin is a two (2) piece cylindrical mandrel with a 0.16 inch diameter and a smooth exterior surface. Each piece has a semicircular cross section. The separator, discussed below, is taken up on the pin. The initial force (tangential) on the separator is 0.5 kgf and thereafter the separator is wound at a rate of ten (10) inches in twenty four (24) seconds. During winding, a tension roller engages the separator being wound on the mandrel. The tension roller comprises a ⅝" diameter roller located on the side opposite the separator feed, a ¾" pneumatic cylinder to which 1 bar of air pressure is applied (when engaged), and a ¼" rod interconnecting the roller and the cylinder.

The separator consists of two (2) 30 mm (width)×10" pieces of the membrane being tested. Five (5) of these separators are tested, the results averaged, and the averaged value is reported. Each piece is spliced onto a separator feed roll on the winding machine with a 1" overlap. From the free end of the separator, i.e., distal the spliced end, ink marks are made at ½" and 7". The ½" mark is aligned with the far side of the pin (i.e., the side adjacent the tension roller), the separator is engaged between the pieces of the pin, and winding is begun with the tension roller engaged. When the 7" mark is about ½" from the jellyroll (separator wound on the pin), the separator is cut at that mark, and the free end of the separator is secured to the jellyroll with a piece of adhesive tape (1" wide, ½" overlap). The jellyroll (i.e., pin with separator wound thereon) is removed from the winding machine. An acceptable jellyroll has no wrinkles and no telescoping.

The jellyroll is placed in a tensile strength tester (i.e., Chatillon Model TCD 500-MS from Chatillon Inc., Greensboro. N.C.) with a load cell (50 lbs×0.02 lb; Chatillon DFGS 50). The strain rate is 2.5 inches per minute and data from the load cell is recorded at a rate of 100 points per second. The peak force is reported as the pin removal force.

Battery Separator

Figure 12B:
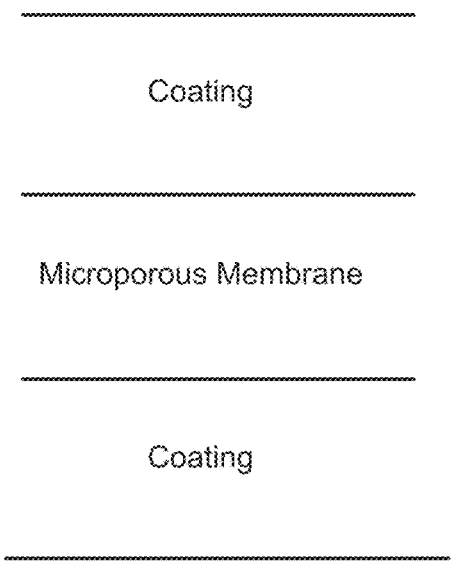
FIG. 12B is a schematic diagram of an exemplary microporous membrane coated on both sides.

In another aspect, a battery separator comprising, consisting of, or consisting essentially of at least one microporous membrane as disclosed herein is described. In some embodiments, the at least one microporous membrane may be coated on one or two sides to form a one or two-side coated battery separator. One-sided coated separators, base films or membranes and two-side coated battery separators, base films or membranes according to some embodiments herein are shown in FIG. 12 The coating layer may comprise, consist of, or consist essentially of, and/or be formed from, any coating composition or deposition (for example, organic, inorganic, polymer, gel, ceramic, metallic, clay, filled, un-filled, adhesive, conductive, non-conductive, porous, non-porous, continuous, non-continuous, or combinations thereof). For example, any coating composition described in U.S. Pat. No. 6,432,586 may be used. The coating layer may be wet, dry, cross-linked, uncross-linked, etc.

In one aspect, the coating layer may be an outermost coating layer of the separator, e.g., it may have no other different coating layers formed thereon, or the coating layer may have at least one other different coating layer formed thereon. For example, in some embodiments, a different polymeric coating layer may be coated over or on top of the coating layer formed on at least one surface of the porous substrate. In some embodiments, that different polymeric coating layer may comprise, consist of, or consist essentially of at least one of polyvinylidene difluoride (PVdF) or polycarbonate (PC).

In some embodiments, the coating layer is applied over top of one or more other coating layers that have already been applied to at least one side of the microporous membrane. For example, in some embodiments, these layers that have already been applied to a the microporous membrane are thin, very thin, or ultra-thin layers of at least one of an inorganic material, an organic material, a conductive material, a semi-conductive material, a non-conductive material, a reactive material, or mixtures thereof. In some embodiments, these layer(s) are metal or metal oxide-containing layers. In some preferred embodiments, a metal-containing layer and a metal-oxide containing layer, e.g., a metal oxide of the metal used in the metal-containing layer, are formed on the porous substrate before a coating layer comprising a coating composition described herein is formed. Sometimes, the total thickness of these already applied layer or layers is less than 5 microns, sometimes, less than 4 microns, sometimes less than 3 microns, sometimes less than 2 microns, sometimes less than 1 micron, sometimes less than 0.5 microns, sometimes less than 0.1 microns, and sometimes less than 0.05 microns.

In some embodiments, the thickness of the coating layer formed from the coating compositions described hereinabove, e.g., the coating compositions described in U.S. Pat. No. 8,432,586, is less than about 12 μm, sometimes less than 10 μm, sometimes less than 9 μm, sometimes less than 8 μm, sometimes less than 7 μm, and sometimes less than 5 μm. In at least certain selected embodiments, the coating layer is less than 4 μm, less than 2 μm, or less than 1 μm.

The coating method is not so limited, and the coating layer described herein may be coated onto a porous substrate, e.g., as described herein, by at least one of the following coating methods: extrusion coating, roll coating, gravure coating, printing, knife coating, air-knife coating, spray coating, dip coating, or curtain coating. The coating process may be conducted at room temperature or at elevated temperatures.

The coating layer may be any one of nonporous, nanoporous, microporous, mesoporous or macroporous. The coating layer may have a JIS Gurley of 700 or less, sometimes 600 or less, 500 or less, 400 or less, 300 or less, 200 or less, or 100 or less. For a nonporous coating layer, the JIS Gurley can be 800 or more, 1,000 or more, 5,000 or more, or 10,000 or more (i.e., "infinite Gurley") For a nonporous coating layer, although the coating is nonporous when dry, it is a good ionic conductor, particularly when it becomes wet with electrolyte.

Composite or Device

A composite or device comprising any battery separator as described hereinabove and one or more electrodes, e.g., an anode, a cathode, or an anode and a cathode, provided in direct contact therewith. The type of electrodes are not so limited. For example the electrodes can be those suitable for use in a lithium ion secondary battery.

Figure 13:
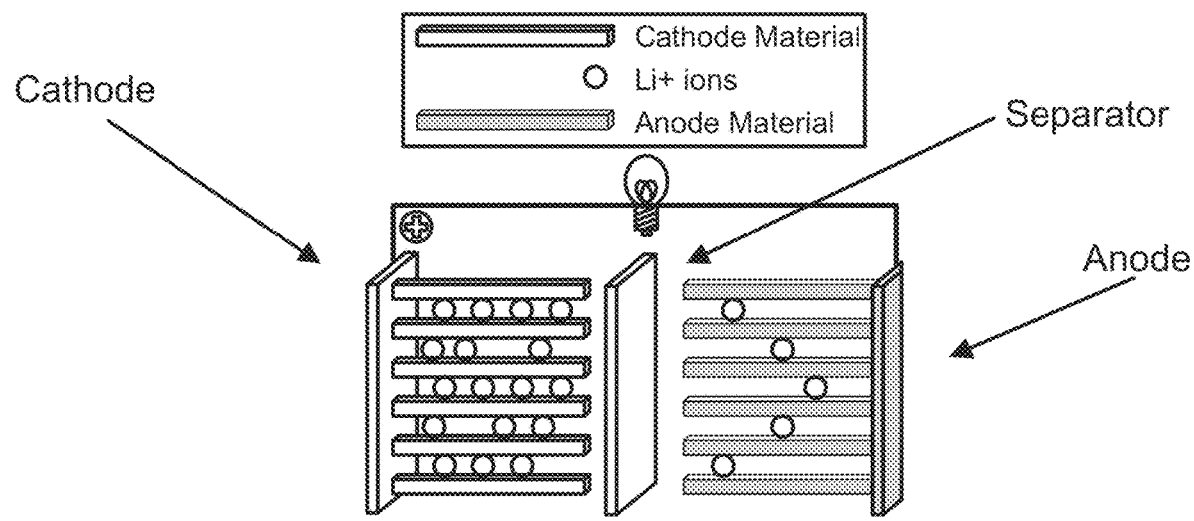
FIG. 13 is a schematic diagram of a lithium-ion battery according to some embodiments herein.

A lithium-ion battery according to some embodiments herein is shown in FIG. 13.

Although any cathode and anode is contemplated, the possibly preferred anode can have an energy capacity greater than or equal to 372 mAh/g, preferably ≥700 mAh/g, and most preferably ≥1000 mAH/g. The anode be constructed from a lithium metal foil or a lithium alloy foil (e.g. lithium aluminum alloys), or a mixture of a lithium metal and/or lithium alloy and materials such as carbon (e.g. coke, graphite), nickel, copper. The anode may or may not be made solely from intercalation compounds containing lithium or insertion compounds containing lithium.

A suitable cathode may be any cathode compatible with the anode and may include an intercalation compound, an insertion compound, or an electrochemically active polymer. Suitable intercalation materials includes, for example, $MoS_2$, $FeS_2$, $MnO_2$, $TiS_2$, $NbSe_3$, $LiCoO_2$, $LiNiO_2$, $LiMn_2O_4$, $V_6O_{13}$, $V_2O_5$, and $CuCl_2$. Suitable polymers include, for example, polyacetylene, polypyrrole, polyaniline, and polythiopene.

Any battery separator described hereinabove may be incorporated to any vehicle, e.g., an e-vehicle, or device, e.g., a cell phone or laptop, that is completely or partially battery powered.

A novel or improved base film for impregnation, impregnated base film, product incorporating the impregnated base film, and/or related methods as shown, claimed or described herein.

Below is described and shown several different types of dry stretch microporous membranes: MD stretched only; MD+TD stretched (TD)(or TDO) (possibly preferably with MD relax during TD stretching); MD+TD stretched+Calendered (TDC).

Figure 14:
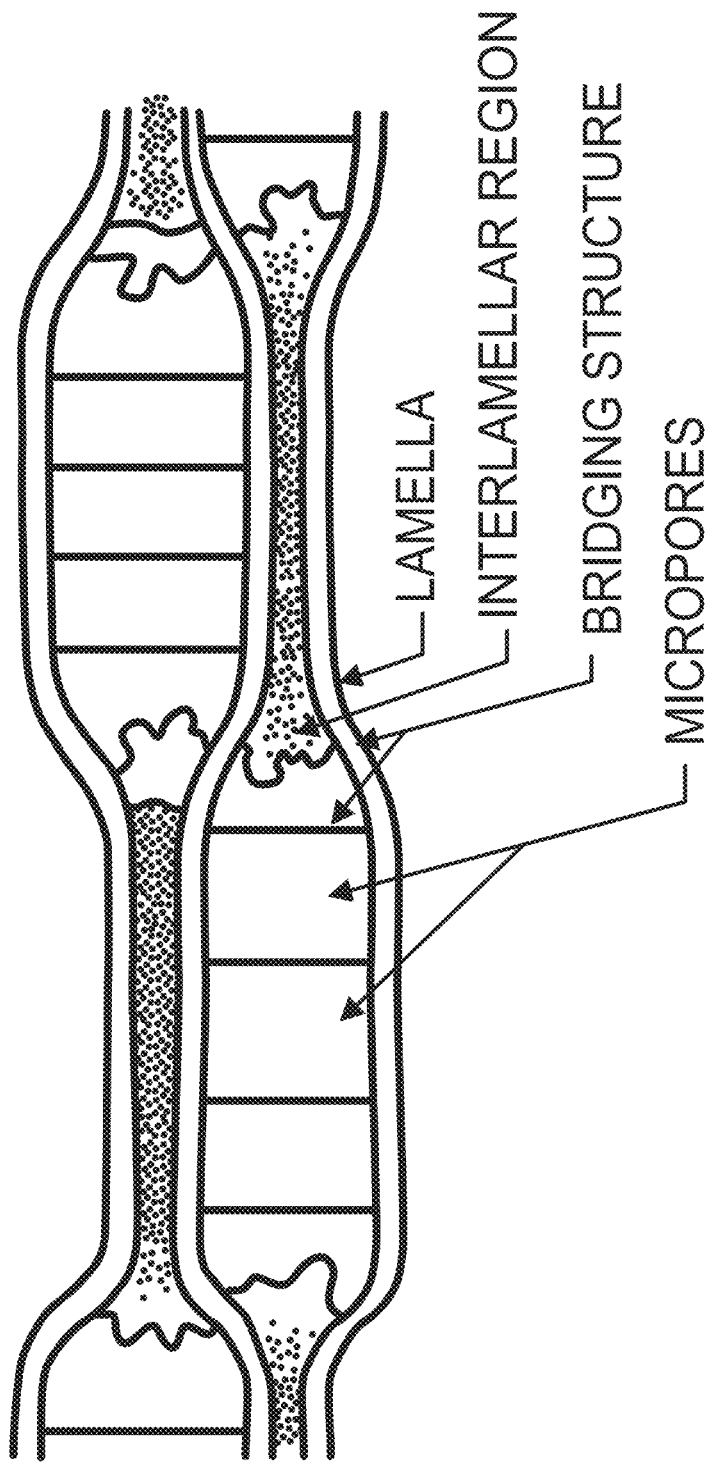
FIG. 14 is a schematic diagram of an SEM of a surface of an example MD stretched dry process membrane showing the microporous structure may be composed of row nucleated crystalline lamellae with fibrillar tie chain-like structures interconnecting the crystalline lamellae.

MD only (no TD, no C): FIG. 14 is a Scanning Electron micrograph of the surface of an example MD stretched dry process membrane showing the microporous structure may be composed of row nucleated crystalline lamellae with fibrillar tie chain-like structures interconnecting the crystalline lamellae. The pores have a rectangular elongate slit-shape which is characteristic of dry process MD stretched microporous membranes.

Figure 15:
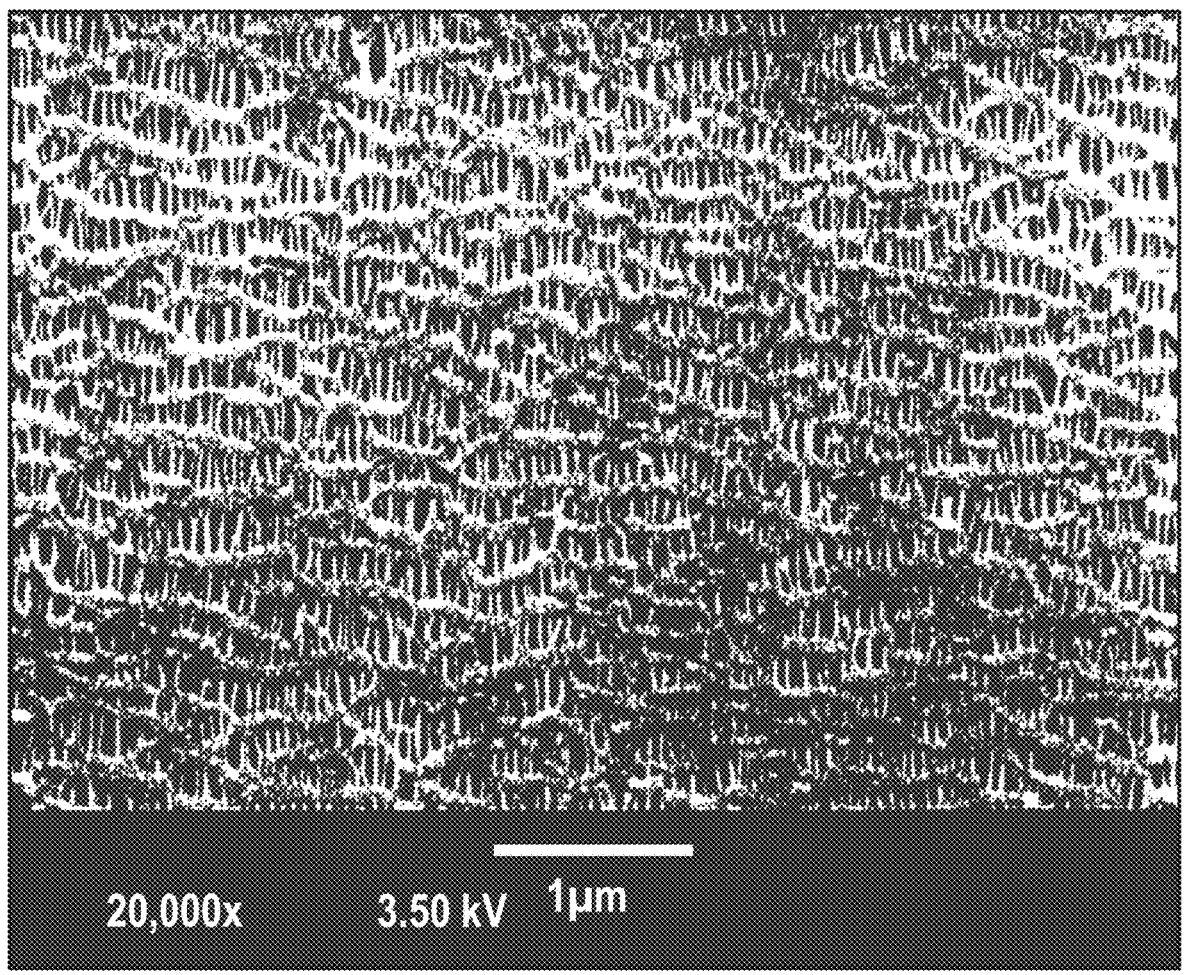
FIG. 15 is an SEM of the surface of an example MD stretched only dry process membrane showing the microporous structure may be composed of row nucleated crystalline lamellae with fibrillar tie chain-like structures interconnecting the crystalline lamellae.

A method or process for producing a MD stretched porous polymer single layer or multilayer membrane for a separator comprising: extruding a polymer to form a nonporous precursor membrane, layer or material, uniaxially stretching the nonporous membrane in the MD, to form a MD stretched, wherein membrane having at least one outer surface or surface layer having a slit-like pore structure with a pore being the opening or space between adjacent lamellae and which may be bounded on one or both sides by a fibril or bridging structure between the adjacent lamellae and wherein at least a portion of the membrane contains respective groups of pores between adjacent lamellae with the lamellae oriented substantially along a transverse direction and the fibrils or bridging structures between the adjacent lamellae oriented substantially along a machine direction:

MD only (no TD, no C): FIG. 15 is a Scanning Electron micrograph (SEM) image of the surface of an example MD stretched dry process membrane showing the microporous structure may be composed of row nucleated crystalline lamellae with fibrillar tie chain-like structures interconnecting the crystalline lamellae. The pores have a rectangular elongate slit-shape which is characteristic of dry process MD stretched microporous membranes.

A method or process for producing a MD stretched porous polymer single layer or multilayer membrane for a separator comprising: extruding a polymer to form a nonporous precursor membrane, layer or material, uniaxially stretching the nonporous membrane in the MD, to form a MD stretched, wherein membrane having at least one outer surface or surface layer having a slit-like pore structure with a pore being the opening or space between adjacent lamellae and which may be bounded on one or both sides by a fibril or bridging structure between the adjacent lamellae and wherein at least a portion of the membrane contains respective groups of pores between adjacent lamellae with the lamellae oriented substantially along a transverse direction and the fibrils or bridging structures between the adjacent lamellae oriented substantially along a machine direction.

Figure 16:
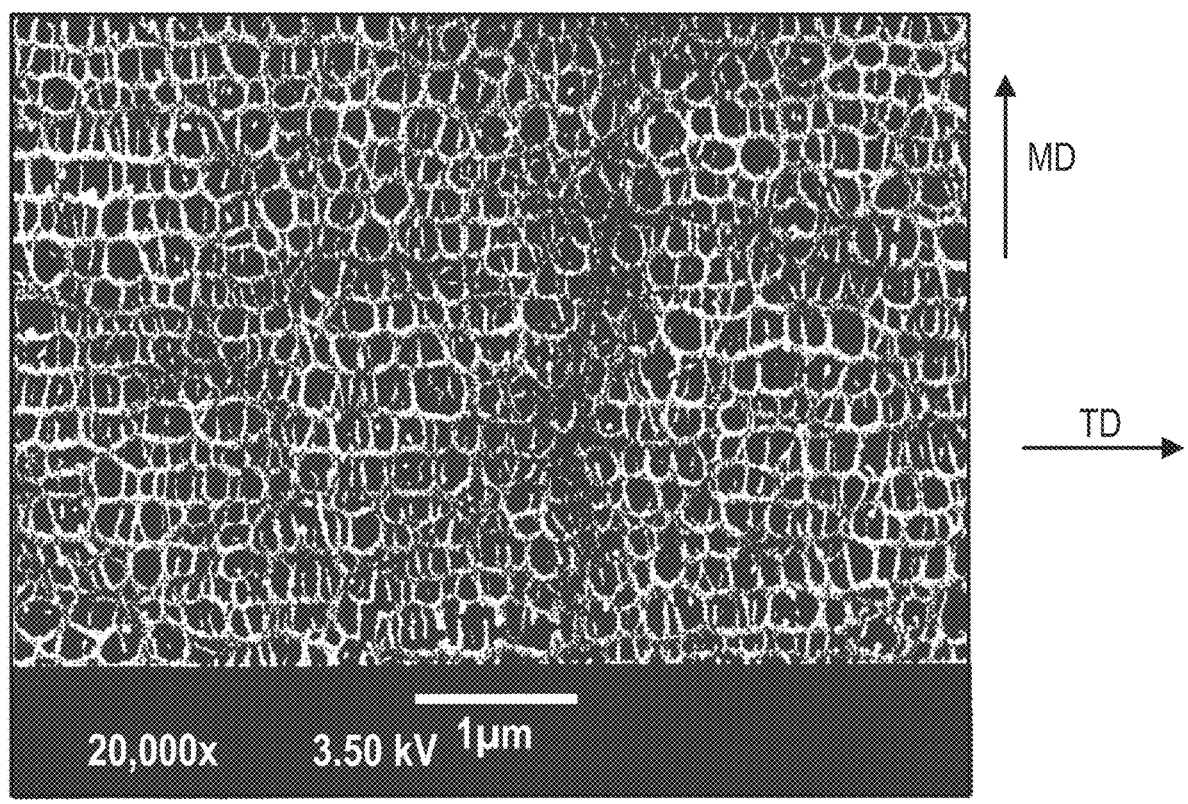
FIG. 16 is an SEM of a MD and TD stretched (MD>TD w/MD relax) microporous membrane.

MD+TD (MD>TD w/MD relax): A method or process for producing a biaxially stretched porous polymer single layer or multilayer membrane for a separator comprising: extruding a polymer to form a nonporous precursor membrane, layer or material, sequentially and/or simultaneously biaxially stretching the nonporous membrane, layer or material to form an MD+TD stretched porous membrane, to form a biaxially stretched membrane, wherein membrane having at least one outer surface or surface layer having a unique rounded or round pore structure with a pore being the opening or space between adjacent lamellae and which may be bounded on one or both sides by a fibril or bridging structure between the adjacent lamellae and wherein at least a portion of the membrane contains respective groups of pores between adjacent lamellae with the lamellae oriented substantially along a transverse direction and the fibrils or bridging structures between the adjacent lamellae oriented substantially along a machine direction (see FIG. 16).

Figure 17:
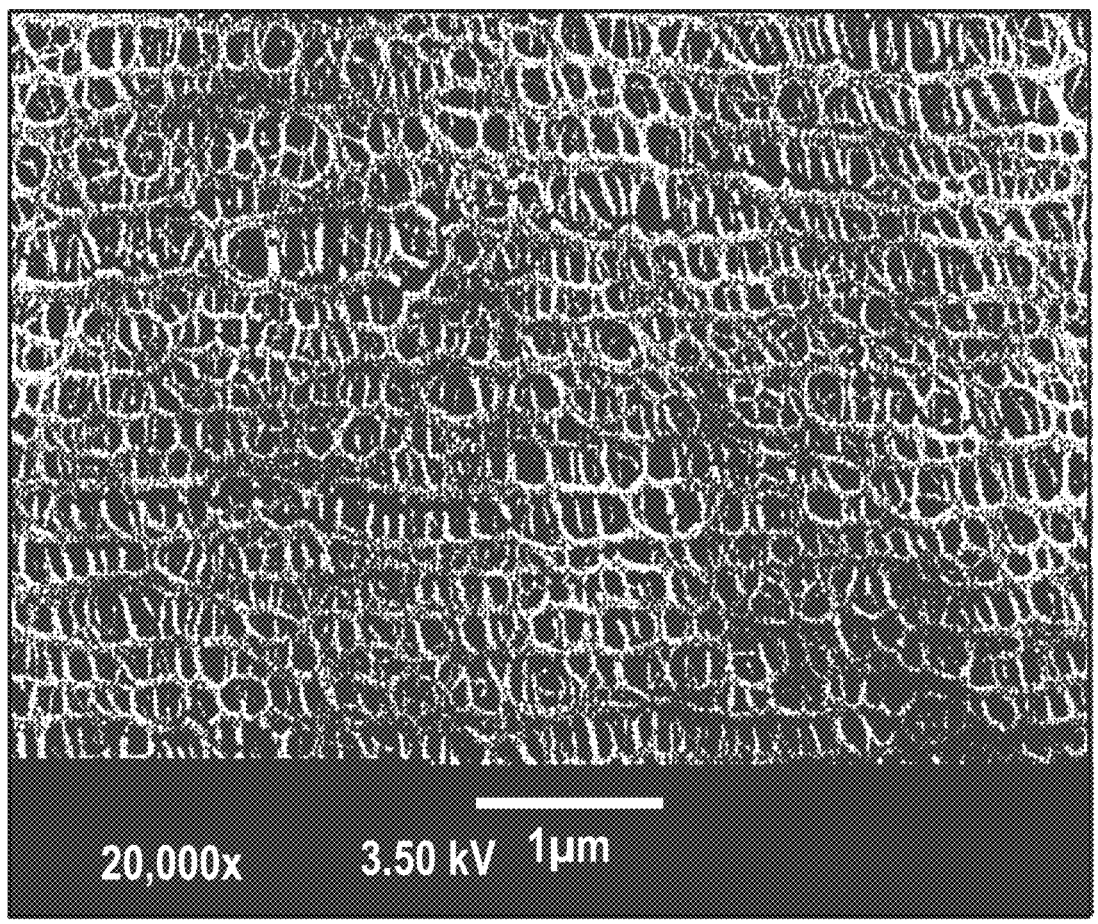
FIG. 17 is an SEM of an MD and TD stretched and calendered microporous membrane.

TDC (MD>TD w/MD relax>C): A method or process for producing a biaxially stretched and calendered porous polymer single layer or multilayer membrane for a separator comprising: extruding a polymer to form a nonporous precursor membrane, layer or material, sequentially and/or simultaneously biaxially stretching the nonporous membrane, layer or material to form an intermediate stretched porous membrane, and calendering the intermediate stretched porous membrane to form a biaxially stretched and calendered membrane, wherein membrane having at least one outer surface or surface layer having a unique pore structure with a pore being the opening or space between adjacent lamellae and which may be bounded on one or both sides by a fibril or bridging structure between the adjacent lamellae and wherein at least a portion of the membrane contains respective groups of pores between adjacent lamellae with the lamellae oriented substantially along a transverse direction and the fibrils or bridging structures between the adjacent lamellae oriented substantially along a machine direction and the outer surface of at least some of the lamellae being substantially flattened or planar (see FIG. 17).

Figure 18:
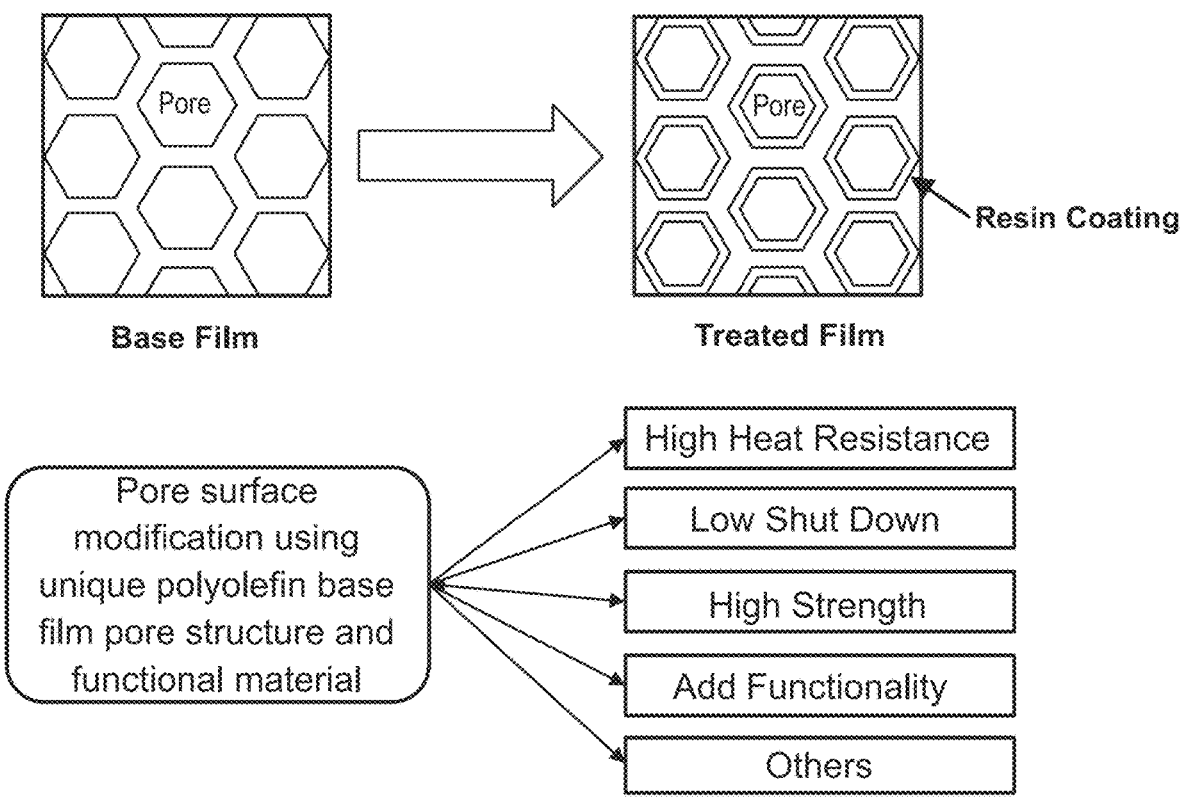
FIG. 18 is a schematic representation of a PO base film membrane (left) and of a treated, pore filled or polymer impregnated PO membrane (right).

FIG. 18 is a schematic representation of a PO base film membrane (left) and of a treated, pore filled or polymer impregnated PO membrane (right).

Figure 19:
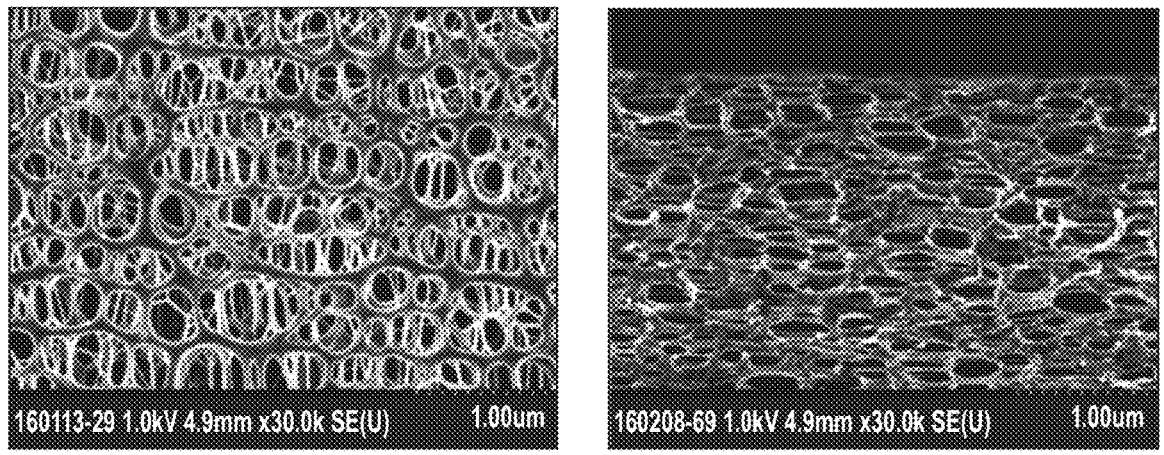
FIG. 19 is an image of surface and cross-section SEMs of a pore filled or polymer impregnated PO membrane.

FIG. 19 is an image of surface and cross-section SEMs of a pore filled or polymer impregnated PO membrane.

Figure 20:
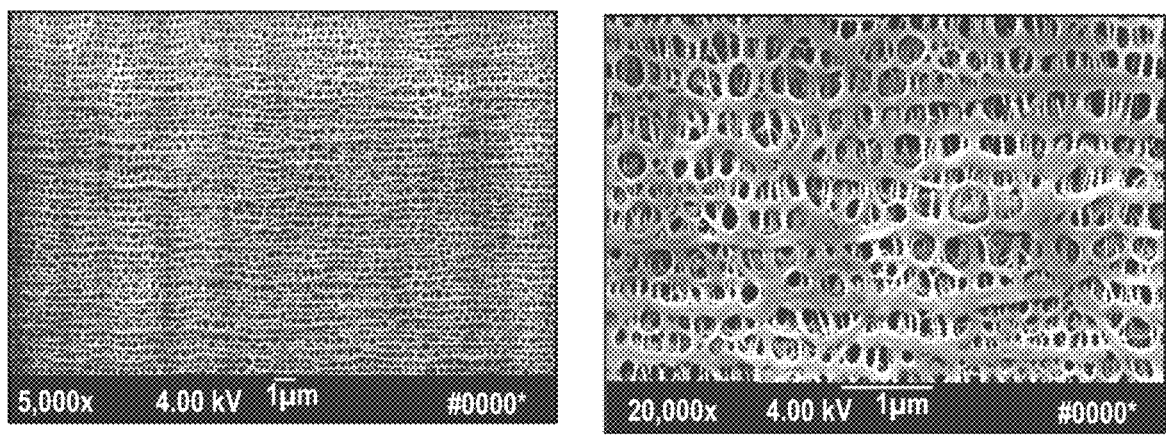
FIG. 20 is an image of surface SEMs of a TDC PP membrane adapted to be pore filled or polymer impregnated.

FIG. 20 is an image of surface SEMs of a TDC PP membrane adapted to be pore filled or polymer impregnated.

Figure 21:
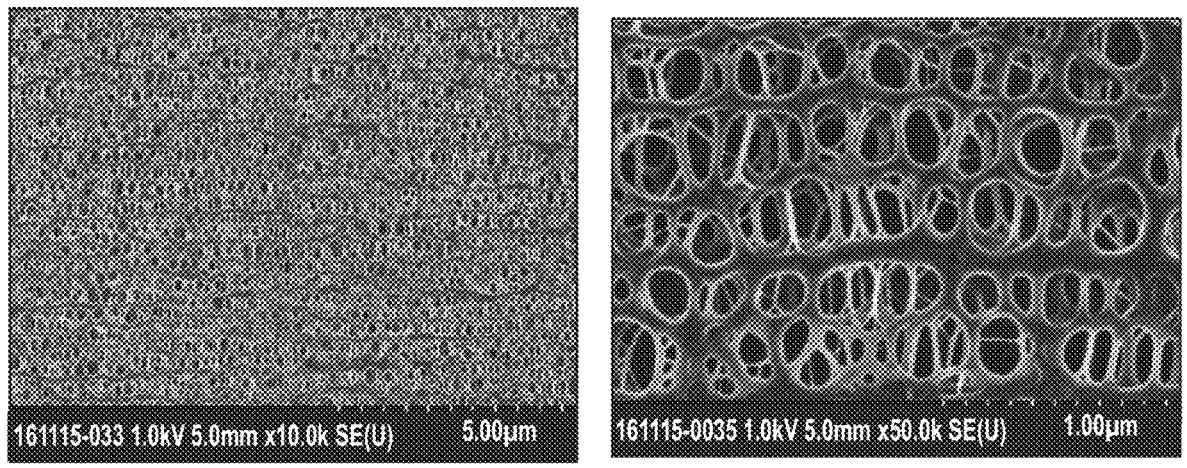
FIG. 21 is an image of surface SEMs of a TDO Tri-Layer membrane (PP/PE/PP) adapted to be pore filled or polymer impregnated.
Figure 22:
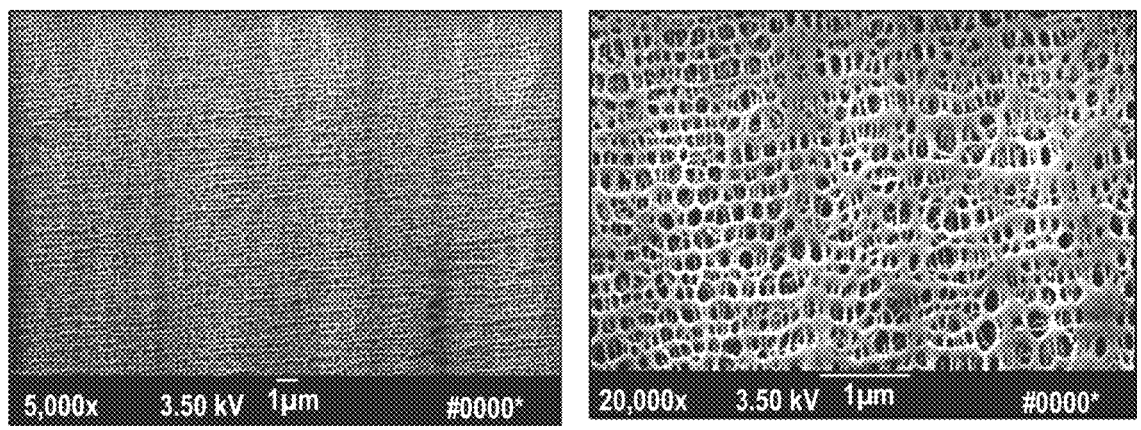
FIG. 22 is an image of surface SEMs of a TDC Tri-Layer membrane (PP/PE/PP) adapted to be pore filled or polymer impregnated.

FIG. 21 is an image of surface SEMs of a TDO Tri-Layer membrane (PP/PE/PP) adapted to be pore filled or polymer impregnated:

FIG. 22 is an image of surface SEMs of a TDC Tri-Layer membrane (PP/PE/PP) adapted to be pore filled or polymer impregnated.

Figure 23:
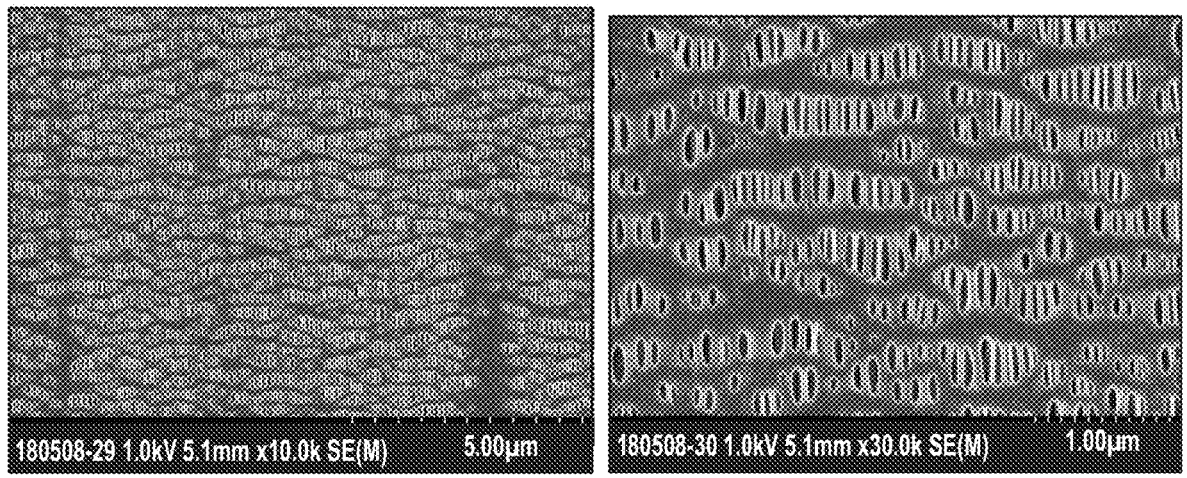
FIG. 23 is an image of surface SEMs of a 9 microlayer Trilayer membrane (PP/PP/PP/PE/PE/PE/PP/PP/PP) adapted to be pore filled or polymer impregnated.

FIG. 23 is an image of surface SEMs of a 9 microlayer Trilayer membrane (PP/PP/PP/PE/PE/PE/PP/PP/PP) adapted to be pore filled or polymer impregnated.

Figure 24:
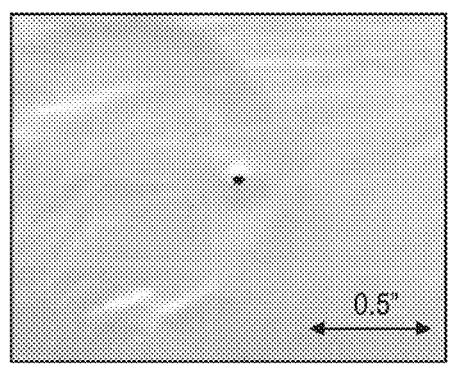
FIG. 24 is a hole shape image of an exemplary round hole in a pore filled or polymer impregnated TDO membrane.

FIG. 24 is a hole shape image of an exemplary round hole in a pore filled or polymer impregnated TDO membrane.

In at least one embodiment, the inventive PO-dipped membrane could be laminated after it is made to another non-PO dipped support (could be another MD-stretched membrane, a nonwoven (NW) membrane, mesh, net, or mat such as a glass mat). The PO dipping could have a dual function in this case: improve strength AND intra-layer adhesion.

In at least another embodiment, the PO-dipping or impregnation could be a gradient or controlled impregnation or coating (for example, if a partially pre-wetted membrane was coated with a PO dipping solution). The coating would in this case only partially impregnate the membrane. There could be a controlled impregnation, for example, where the PO dipping material is a blend of two polymer resins where one more easily penetrates the membrane than the other (which would remain near the surface).

The membrane or separator may be a cut piece, slit, leaf, sleeve, pocket, envelope, wrap, Z fold, serpentine, and/or the like. The membrane or separator may be a flat sheet, tape, slit, non-woven, woven, mesh, knit, hollow fiber, and/or the like. The membrane or separator may be adapted for use in a electrochemical device, battery, cell, ESS, UPS, capacitor, supercapacitor, double layer capacitor, fuel cell (PEM, humidity control membrane, . . . ), catalyst carrier, carrier, pancake (anode, separator, cathode), base film, coated base film, textile, barrier layer in textile, hazmat suit, barrier layer in hazmat suit, blood barrier, water barrier, filtration media, blood, blood components, blood oxygenator, disposable lighter, and/or the like.

The instant battery separator may be a co-extruded, multi-layered battery separator. Co-extruded refers to a process where polymers are simultaneously brought together in an extrusion die and exit from the die in a form, here a generally planar structure, having at least two discrete layers joined together at the interface of the discrete layers by, for example, a commingling of the polymers forming the interface of the discrete layers. The extrusion die may be either a flat sheet (or slot) die or a blown film (or annular) die. The co-extrusion process shall be described in greater detail below. Multi-layered refers to a separator having at least two layers. Multi-layered may also refer to structures with 3, 4, 5, 6, 7, or more layers. Each layer is formed by a separate polymer feed stream into the extrusion die. The layers may be of differing thicknesses. Most often, at least two of the feed streams are of dissimilar polymers. Dissimilar polymer refers to: polymers having dissimilar chemical natures (e.g., PE and PP, or PE and a co-polymer of PE are polymers having dissimilar chemical natures); and/or polymer having the same chemical nature but dissimilar properties (e.g., two PE's having differing properties (e.g., density, molecular weights, molecular weight distributions, rheology, additives (composition and/or percentage), etc.)) However, the polymers may be the same or identical.

The polymers that may be used in the instant battery separator are those that are extrudable. Such polymers are typically referred to as thermoplastic polymers. Exemplary thermoplastic polymers include, but are not limited to: polyolefins, polyacetals (or polyoxymethylenes), polyamides, polyesters, polysulfides, polyvinyl alcohols, polyvinyl esters, and polyvinylidenes. Polyolefins include, but are not limited to: polyethylene (including, for example, LDPE, LLDPE, HDPE, UHDPE), polypropylene, polybutylene, polymethylpentane, co-polymers thereof, and blends thereof. Polyamides (nylons) include, but are not limited to: polyamide 6, polyamide 66, Nylon 10,10, polyphthalamide (PPA), co-polymers thereof, and blends thereof. Polyesters include, but are not limited to: polyester terephalthalate, polybutyl terephalthalate, co-polymers thereof, and blends thereof. Polysulfides include, but are not limited to, polyphenyl sulfide, co-polymers thereof, and blends thereof. Polyvinyl alcohols include, but are not limited to: ethylene-vinyl alcohol, co-polymers thereof, and blends thereof. Polyvinyl esters include, but are not limited to, polyvinyl acetate, ethylene vinyl acetate, co-polymers thereof, and blends thereof. Polyvinylidenes include, but are not limited to: fluorinated polyvinylidenes (e.g., polyvinylidene chloride, polyvinylidene fluoride), co-polymers thereof, and blends thereof.

Various materials may be added to the polymers. These materials are added to modify or enhance the performance or properties of an individual layer or the overall separator.

Materials to lower the melting temperature of the polymer may be added. Typically, the multi-layered separator includes a layer designed to close its pores at a predetermined temperature to block the flow of ions between the electrodes of the battery. This function is commonly referred to as 'shutdown.' In one embodiment, a trilayer separator has a middle shutdown layer. To lower the shutdown temperature of the layer, materials, with a melting temperature less than the polymer to which they are mixed, may be added to the polymer. Such materials include, but are not limited to: materials with a melting temperature less than 125.degree. C., for example, polyolefins or polyolefin oligomers. Such materials include, but are not limited to: polyolefin waxes (polyethylene wax, polypropylene wax, polybutene wax, and blends thereof). These materials may be loaded into the polymer at a rate of 5-50 wt % of the polymer. Shutdown temperatures below 140 degree C. are obtainable in one embodiment. Shutdown temperatures below 130 degree C. are obtainable in other embodiments.

Materials to improve the melt integrity of the membrane may be added. Melt integrity refers to the ability of the membrane to limit its loss or deterioration of its physical dimension at elevated temperatures such that the electrodes remain physically separated. Such materials include mineral fillers. Mineral fillers include, but are not limited to: talc, kaolin, synthetic silica, diatomaceous earth, mica, nanoclay, boron nitride, silicon dioxide, titanium dioxide, barium sulfate, calcium carbonate, aluminum hydroxide, magnesium hydroxide and the like, and blends thereof. Such materials may also include, but are not limited to, fine fibers. Fine fibers include glass fibers and chopped polymer fibers. Loading rates range from 1-60 wt % of the polymer of the layer. Such materials may also include high melting point or high viscosity organic materials, e.g., PTFE and UHMWPE. Such materials may also include cross-linking or coupling agents.

Materials to improve the strength or toughness of the membrane may be added. Such materials include elastomers. Elastomers include, but are not limited to: ethylene-propylene (EPR), ethylene-propylene-diene (EPDM), styrene-butadiene (SBR), styrene isoprene (SIR), ethylidene norbornene (ENB), epoxy, and polyurethane and blends thereof. Such materials may also include, but are not limited to, fine fibers. Fine fibers include glass fibers and chopped polymer fibers. Loading rates range from 2-30 wt % of the polymer of the layer. Such materials may also include cross-linking or coupling agents or high viscosity or high melting point materials.

Materials to improve the antistatic properties of the membrane may be added. Such materials include, for example, antistatic agents. Antistatic agents include, but are not limited to, glycerol monostreates, ethoxylated amines, polyethers (e.g., Pelestat 300, commercially available from Sanyo Chemical Industrial of Japan). Loading rates range from 0.001-10 wt % of the polymer of the layer.

Materials to improve the surface wettability of the separator may be added. Such materials include, for example, wetting agents. Wetting agents include, but are not limited to, ethoxylated alcohols, primary polymeric carboxylic acids, glycols (e.g., polypropylene glycol and polyethylene glycols), polyolefin functionalized with maleic anhydride, acrylic acid, glycidyl methacrylate. Loading rates range from 0.01-10 wt % of the polymer of the layer.

Materials to improve the surface tribology performance of the separator may be added. Such materials include lubricants. Lubricants include, for example, fluoropolymers (e.g., polyvinylidene fluoride, polytetrafluoroethylene, low molecular weight fluoropolymers), slip agents (e.g., oleamide, stearamide, erucamide, Kemamide.®, calcium stearate, silicone. Loading rates range from 0.001-10 wt % of the polymer of the layer.

Materials to improve the polymer processing may be added. Such materials include, for example, fluoropolymers, boron nitride, polyolefin waxes. Loading rates range from 100 ppm to 10 wt % of the polymer of the layer.

Materials to improve the flame retardant nature of the membrane may be added. Such materials include, for example, brominated flame retardants, ammonium phosphate, ammonium hydroxide, alumina trihydrate, and phosphate ester.

Materials to facilitate nucleation of the polymer may be added. Such materials include nucleating agents. Nucleating agents include, but are not limited to, sodium benzoate, dibenzylidene sorbitol (DBS) and it chemical derivatives. Loading rates are conventional.

Materials to color the layers may be added. Such materials are conventional.

In the manufacture of the instant battery separator, the polymers are co-extruded to form a multi-layered, nonporous precursor, and then the precursor is processed to form the micropores. Micropores may be formed by a 'wet' process or a 'dry' process. The wet process (also referred as: solvent extraction, phase inversion, thermally induced phase separation (TIPS), or gel extraction) generally involves: the addition of a removable material prior to the formation of the precursor, and subsequently removing that material, for example, by an extraction process to form the pores. The dry process (also referred to as the Celgard process) generally involves: extruding a precursor (not including any removal material for pore formation); annealing the precursor, and stretching the precursor to form the micropores. The instant invention will be discussed hereinafter with regard to the dry process.

To obtain the uniform dimensional properties of the instant co-extruded, multi-layered battery separator, an extrusion die having a specific shear rate was used. It was determined that the shear rate of the die must be at a minimum 4/sec at a throughput of 18-100 lbs/hr (8.2-45.4 Kg/hr) per layer. In one embodiment, the shear rate was .gtoreq.8/sec at a throughput of 18-100 lbs/hr (8.2-45.4 Kg/hr) per layer. All other parameters are those conventionally known.

Various embodiments of the invention have been described in fulfillment of the various objects of the invention. It should be recognized that these embodiments are merely illustrative of the principles of the present invention. Numerous modifications and adaptations will be readily apparent to those skilled in the art without departing from the spirit and scope of this invention.

The invention claimed is:

1. A dry process polymer membrane adapted for use as or in a separator for a lithium battery, including at least one mesoporous, microporous, or nanoporous impregnated membrane film, with at least one area of surfaces of pores in the polymer membrane having a first thin layer of at least a first impregnate material, comprising a polymer resin (B) as a major component therein wherein the polymer resin (B) is polyvinylidene difluoride (PVdF), polycarbonate (PC) or a combination thereof, at least an about 10% impregnation depth into the thickness of the polymer membrane, and wherein the membrane film has a polymer resin (A) as a major component; and, and, wherein the dry process polymer membrane has a composite splittiness index of greater than 140 measured where composite splittiness index is defined by the equation below where composite splittiness index is a function of the first load peak, the second load peak, TD tensile strength, MD tensile strength, and TD elongation measured during puncture strength testing:

$$CSI=(A-|B-A|^{1.8}) \times C \times (D \times E)/10^6$$

where:
A=First Load Peak/(Thickness×(1−% Porosity));
B=Second Load Peak/Thickness;
C=TD Elongation;
D=MD Tensile Strength;
E=TD Tensile Strength; and
where First and Second Load Peak are in units of gram-force, thickness values are in microns, MD and TD tensile strength are in gram-force, and TD elongation is expressed as percentage; and
wherein the dry process polymer membrane comprises groups of pores between adjacent lamellae with the lamellae oriented substantially along a transverse direction and fibrils or bridging structures between the adjacent lamellae oriented substantially along a machine direction and an outer surface of at least some of the lamellae being substantially flattened or planar.

2. The dry process polymer membrane of claim 1, wherein the first impregnate material further comprises at least one solvent residual component or other additives, agents, or fillers.

3. The dry process polymer membrane of claim 1, wherein the resin (B) is different from the resin (A).

4. The dry process polymer membrane of claim 1, wherein the polymer resin (B) forms a thin coating that makes the coated membrane film nanoporous, microporous, mesoporous, stronger, more versatile, oleophobic, hydrophilic, exhibit higher puncture strength, higher temperature melt integrity, more oxidation resistance, lower temperature shutdown, lower COF, lower pin removal force, higher coating adhesion, and/or functionalization, improved elongation at break, improved hole shape in TMA or compression TMA testing (round in place of tear), improved nail penetration test results (pass NPT), improved transverse direction (TD) tensile strength, improved balance of MD and TD strength properties, improved functionalization, improved ionic conductance, provide shutdown, may be sticky (adhesive, surface), may be ceramic coated, may be IR detectable, may be SEM detectable, may be a catalyst, may provide cross linking, and/or other improved performance, function, and/or characteristics, and/or combinations thereof.

5. The dry process polymer membrane of claim 1, wherein the pores of the membrane film have a primer, deposition, treatment, PVD, ALD, solvent, corona, plasma, or combinations thereof added before and/or after the impregnation or coating of polymer resin (B).

6. The dry process polymer membrane of claim 1, wherein the pores of the membrane film have a minimum pore dimension of >2 times the thickness of the coating of polymer resin (B) or have a minimum average pore dimension of >2 times the thickness of the coating of polymer resin (B).

7. The dry process polymer membrane of claim 1, wherein the coated or impregnated membrane film is at least microporous.

8. The dry process polymer membrane of claim 1, wherein the minimum thickness of the coating of polymer resin (B) is >0.001 um.

9. The dry process polymer membrane of claim 1, wherein the average thickness of the coating of polymer resin (B) is <1.0 um.

10. The dry process polymer membrane of claim 1, wherein the minimum pore dimension of the pores of the polymer membrane film is at least >2 times the thickness of the coating of polymer resin (B) or the thickness of the coating of polymer resin (B) plus any additional coatings, treatments, depositions, and/or the like on the interior surfaces of the pores.

11. The dry process polymer membrane of claim 1, wherein the minimum pore dimension of the pores of the membrane film is at least 0.20 um.

12. The dry process polymer membrane of claim 1, wherein the maximum pore dimension of the pores of the membrane film-is less than 15.0 um.

13. The dry process polymer membrane of claim 1, wherein the minimum effective cross-sectional area of at least 80% of the pores of the coated membrane film is at least $7.85 \times 10^{-7}$ um$^2$ per pore.

14. The dry process polymer membrane of claim 1, wherein the coated membrane film has a maximum Gurley of 3,000 s.

15. The dry process polymer membrane of claim 1, wherein the coated membrane film has a minimum porosity of at least 20%, or an ER of less than 3.0 ohm-cm$^2$, or a tortuosity of less than 2.0.

16. The dry process polymer membrane of claim 1, wherein the coated membrane film has an average pore size greater than 0.01 um, or an average pore size less than 2.0 um.

17. The dry process polymer membrane of claim 1, wherein the membrane film has round shaped pores, or has resultant pore shapes with rounder corners and smaller pore dimensions than the pore shapes of the uncoated polymer membrane film, or has resultant pore shapes of oval, ovoid, egg shaped, elliptical, truncated oval, or elongated oval.

18. The dry process polymer membrane of claim 1, wherein the coated membrane film is adapted to be coated, polymer coated, or ceramic coated on at least one side thereof.

19. The dry process polymer membrane of claim 1, wherein one half of the surfaces of the pores in the membrane film are coated or treated with the polymer resin (B) and the other half of the surfaces of the pores in the membrane film are coated or treated with a polymer resin (C), wherein the resin (C) is different from the resin (B).

20. A lithium battery comprising a battery separator which comprises the dry process polymer membrane of claim 1.

21. A device, product, system, or vehicle comprising the battery of claim 20.

22. A capacitor, super capacitor, or capacitor battery hybrid, the improvement comprising the polymer membrane of claim 1.

23. A textile, garment, wipe, filter, medical product, HVAC filter, fuel cell, humidity control layer, base film to be coated, comprising the polymer membrane of claim 1.

* * * * *